US010305683B1

(12) United States Patent
Ghafourifar et al.

(10) Patent No.: US 10,305,683 B1
(45) Date of Patent: *May 28, 2019

(54) SYSTEM AND METHOD OF APPLYING MULTIPLE ADAPTIVE PRIVACY CONTROL LAYERS TO MULTI-CHANNEL BITSTREAM DATA

(71) Applicant: Entefy Inc., Palo Alto, CA (US)

(72) Inventors: Alston Ghafourifar, Los Altos Hills, CA (US); Vincente Ciancio, Santa Clara, CA (US)

(73) Assignee: Entefy Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,272

(22) Filed: Dec. 29, 2017

(51) Int. Cl.
G06F 21/62 (2013.01)
H04L 9/08 (2006.01)

(52) U.S. Cl.
CPC ........ *H04L 9/0816* (2013.01); *G06F 21/6218* (2013.01)

(58) Field of Classification Search
CPC ..... G06F 21/602; H04L 9/0816; H04L 22/24; H04L 9/00; G09C 5/00
See application file for complete search history.

(56) References Cited

U.S. PATENT DOCUMENTS

| 6,067,399 | A | 5/2000 | Berger | |
|---|---|---|---|---|
| 8,744,143 | B2 * | 6/2014 | Chen | G06F 21/6245 348/143 |
| 8,799,022 | B1 | 8/2014 | O'Brien | |
| 9,264,581 | B2 | 2/2016 | Lerios | |
| 9,350,914 | B1 | 5/2016 | Kaur | |
| 9,426,387 | B2 | 8/2016 | Jung | |
| 9,571,785 | B2 | 2/2017 | Farrell | |
| 9,590,949 | B2 | 3/2017 | Murphy | |
| 9,646,398 | B2 | 5/2017 | Yuan | |
| 9,749,321 | B2 | 8/2017 | Farnsworth | |
| 2001/0055396 | A1 | 12/2001 | Jevans | |
| 2002/0078361 | A1* | 6/2002 | Giroux | H04L 63/0428 713/183 |
| 2003/0105719 | A1* | 6/2003 | Berger | G06F 21/6245 705/51 |

(Continued)

OTHER PUBLICATIONS

Goyal, et al., "Attribute-Based Encryption for Fine-Grained Access Control of Encrypted Data," '06, Oct. 30-Nov. 3, 2006, Alexandria, Virginia, USA.

*Primary Examiner* — Wasika Nipa
(74) *Attorney, Agent, or Firm* — Blank Rome LLP

(57) ABSTRACT

Disclosed are systems to apply customized permission settings to protect particular portions of a document, and, in particular, documents that are of bitstream datatypes containing multiple channels of audio, encoded or not encoded. The custom access permission settings may be implemented by obfuscating the protected portions of the original bitstream and then embedding "secret," e.g., hidden and/or encrypted, versions of the obfuscated portions in parts of the data structure of the original file, e.g., in the form of "layers" that are held within audio stream containers such as channels. The content of the individual encrypted audio stream containers may then be decrypted according to each recipient's permissions and layered on top of the obfuscated portions of the encoded media file before being rendered to the recipient.

17 Claims, 20 Drawing Sheets

(56) References Cited

U.S. PATENT DOCUMENTS

| | | |
|---|---|---|
| 2003/0108240 A1 | 6/2003 | Gutta |
| 2005/0002585 A1 | 1/2005 | Brauckmann |
| 2006/0017747 A1 | 1/2006 | Dawson |
| 2008/0140578 A1 | 6/2008 | Felt |
| 2008/0193018 A1 | 8/2008 | Masuda |
| 2008/0267403 A1 | 10/2008 | Boult |
| 2009/0207269 A1 | 8/2009 | Yoda |
| 2009/0244364 A1 | 10/2009 | Nonogaki |
| 2010/0103193 A1 | 4/2010 | Abe |
| 2010/0246890 A1 | 9/2010 | Ofek |
| 2011/0150217 A1 | 6/2011 | Kim |
| 2013/0011068 A1 | 1/2013 | Albouyeh |
| 2013/0024901 A1 | 1/2013 | Sharif-Ahmadi |
| 2013/0093829 A1 | 4/2013 | Rosenblatt |
| 2013/0156263 A1 | 6/2013 | Yamashita |
| 2013/0202109 A1 | 8/2013 | Ducharme |
| 2014/0112534 A1 | 4/2014 | Sako |
| 2015/0006390 A1 | 1/2015 | Aissi |
| 2015/0016602 A1* | 1/2015 | de los Reyes ........... G09C 5/00 380/28 |
| 2015/0033362 A1 | 1/2015 | Mau |
| 2015/0113661 A1 | 4/2015 | Mishra |
| 2015/0371049 A1 | 12/2015 | Xavier |
| 2015/0371613 A1 | 12/2015 | Patel |
| 2016/0034704 A1 | 2/2016 | Shim |
| 2016/0217300 A1 | 7/2016 | Kim |
| 2016/0241627 A1 | 8/2016 | Ortega |
| 2016/0283096 A1 | 9/2016 | Yao |
| 2016/0292494 A1 | 10/2016 | Ganong |
| 2016/0294781 A1* | 10/2016 | Ninan ................. H04L 63/0407 |
| 2016/0316219 A1 | 10/2016 | Yuan |
| 2017/0061155 A1 | 3/2017 | Gordon |
| 2017/0220816 A1 | 8/2017 | Matusek |
| 2018/0124055 A1 | 5/2018 | Chen |

\* cited by examiner

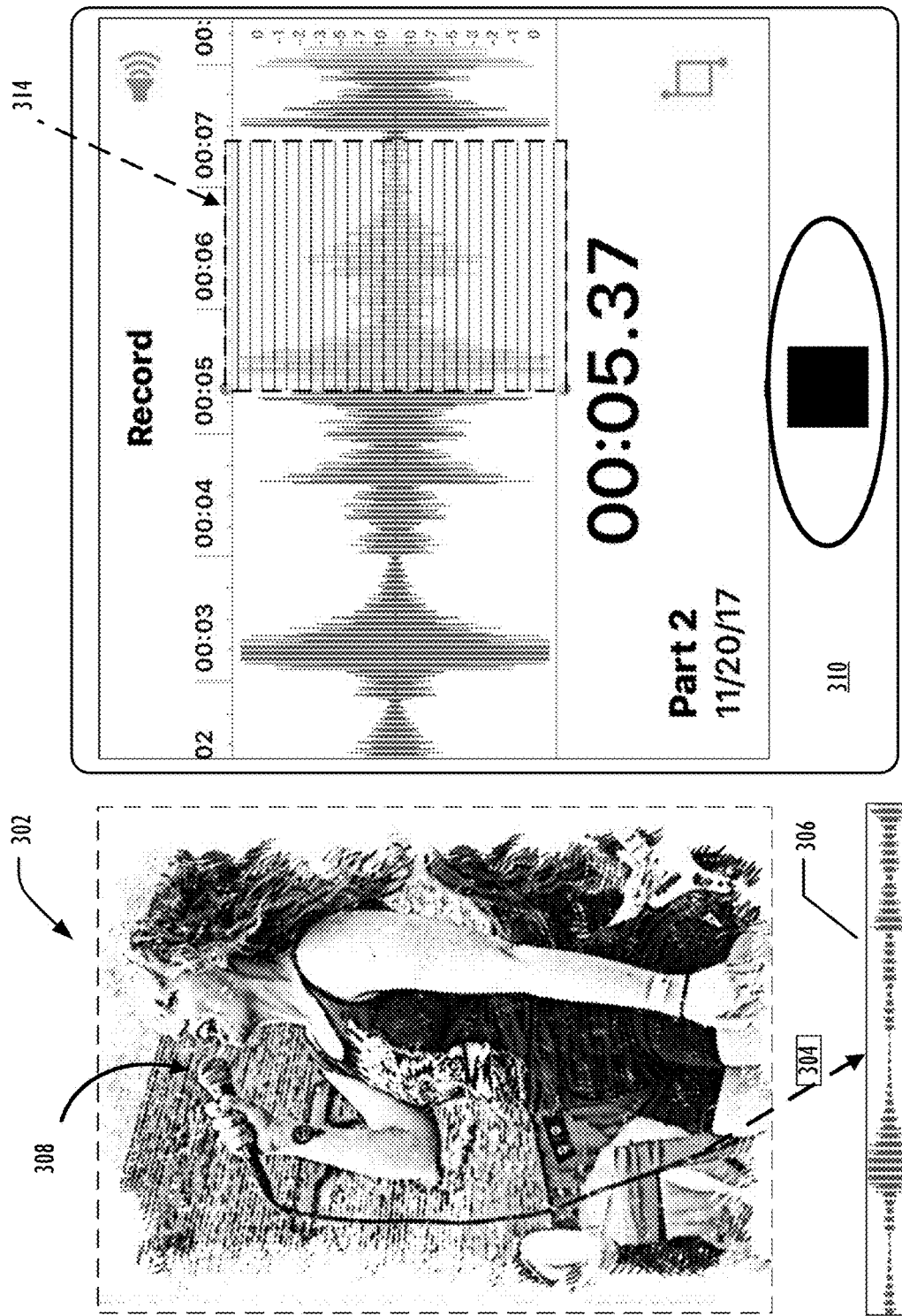

SYSTEM AND METHOD OF APPLYING MULTIPLE ADAPTIVE PRIVACY CONTROL LAYERS TO MULTI-CHANNEL BITSTREAM DATA

CROSS-REFERENCE TO RELATED APPLICATIONS

This application is related to U.S. patent application Ser. No. 14/584,329, filed Dec. 29, 2014, entitled "System and Method of Determining User-Defined Permissions Through a Network," which is entirely incorporated by reference herein.

TECHNICAL FIELD

This disclosure relates generally to systems, methods, and computer readable media for concealing information within encoded media files which may be distributed over a network and playable by recipients in a wide array of standardized software applications. More particularly, this disclosure is relates to Adaptive Privacy Controls for concealing information within audio files and audio bitstreams. Access permission settings for such audio files may be implemented by embedding one or more "secret," e.g., hidden and/or encrypted, information portions in such encoded media file types, e.g., in the form of layers of audio information.

BACKGROUND

The proliferation of personal computing devices in recent years, especially mobile personal computing devices, combined with a growth in the number of widely-used communications formats (e.g., text, voice, video, image) and protocols (e.g., SMTP, IMAP/POP, SMS/MMS, XMPP, etc.) has led to increased concerns regarding the safety and security of documents and messages that are sent over networks. Users desire a system that provides for the setting of custom, e.g., user-defined, access permissions for all or part of a file, including audio files that may or may not have been encoded using compression techniques.

SUMMARY

A system and methods for concealing audio information within audio files and for providing access permission settings for audio through Adaptive Privacy Controls (APC) are described herein. APC, as used herein, will refer to a user-controllable or system-generated, intelligent privacy system that can limit playback, editing, and re-sharing privileges for audio files, for example, audio files in which portions of audio are redacted or screened such that only those with permission may access such portions. Embodiments of APC systems can handle the setting of access permissions for recipients of audio files of various formats. In summary, APC systems, as used herein, allow users to share whatever information they want with whomever they want, while keeping others from accessing the concealed information, e.g., via hiding and/or encryption processes that can be initiated by user command or via system intelligence. APC access permission settings may be applied to individuals, pre-defined groups, and/or ad-hoc groups. Customized encryption keys may further be applied to particular parties or groups of parties to enhance the security of the permission settings.

APC may be used to apply privacy settings to only particular portions of an audio file, for example, a particular portion of a bitstream from an audio file. For example, User A may be a family member who may be authorized to hear an entire audio recording, but User B and other users may be mere acquaintances, who are only authorized to hear a redacted version of the audio recording.

According to some embodiments disclosed herein, a standard, i.e., "unauthorized," listening application, e.g. an audio player or audio-video player, would only be able to open the redacted version of a secured file. According to still other embodiments, even if an unauthorized application were able to gain access to the redacted or screened portions of an audio file, the application, the redacted portion or portions may be encrypted, and the unauthorized playback application would not possess the necessary decryption keys to decrypt the encrypted redacted portion or portions. In other embodiments, the redacted and encrypted information may be scattered throughout an audio file or bitstream such that only a properly configured player may be able to locate the secured information.

Thus, according to some embodiments, the network-based, user-defined, APC controls for audio or audio-video file types or files (e.g., encoded media file types, such as MP3) may include access permission systems, methods, and computer readable media that provide a seamless, intuitive user interface (e.g., using touch gestures or mouse input) allowing a user to: "block out" particular portions or portions of interest in audio files; hide (and optionally encrypt) such "blocked out" regions within parts the audio file's data structure; and then send the audio file to particular recipients or groups of recipients with customized access permission settings, which settings may be specified on a per-recipient or per-group basis, and that either allow or do not allow a given recipient to extract the protected portions and decrypt such protected portions (if encrypted), so that the original audio file may be reconstructed by the recipient.

BRIEF DESCRIPTION OF THE DRAWINGS

FIG. 3A and FIG. 3B illustrate an example of selecting a portion of an audio file for obfuscation.

DETAILED DESCRIPTION

Figure 1A:
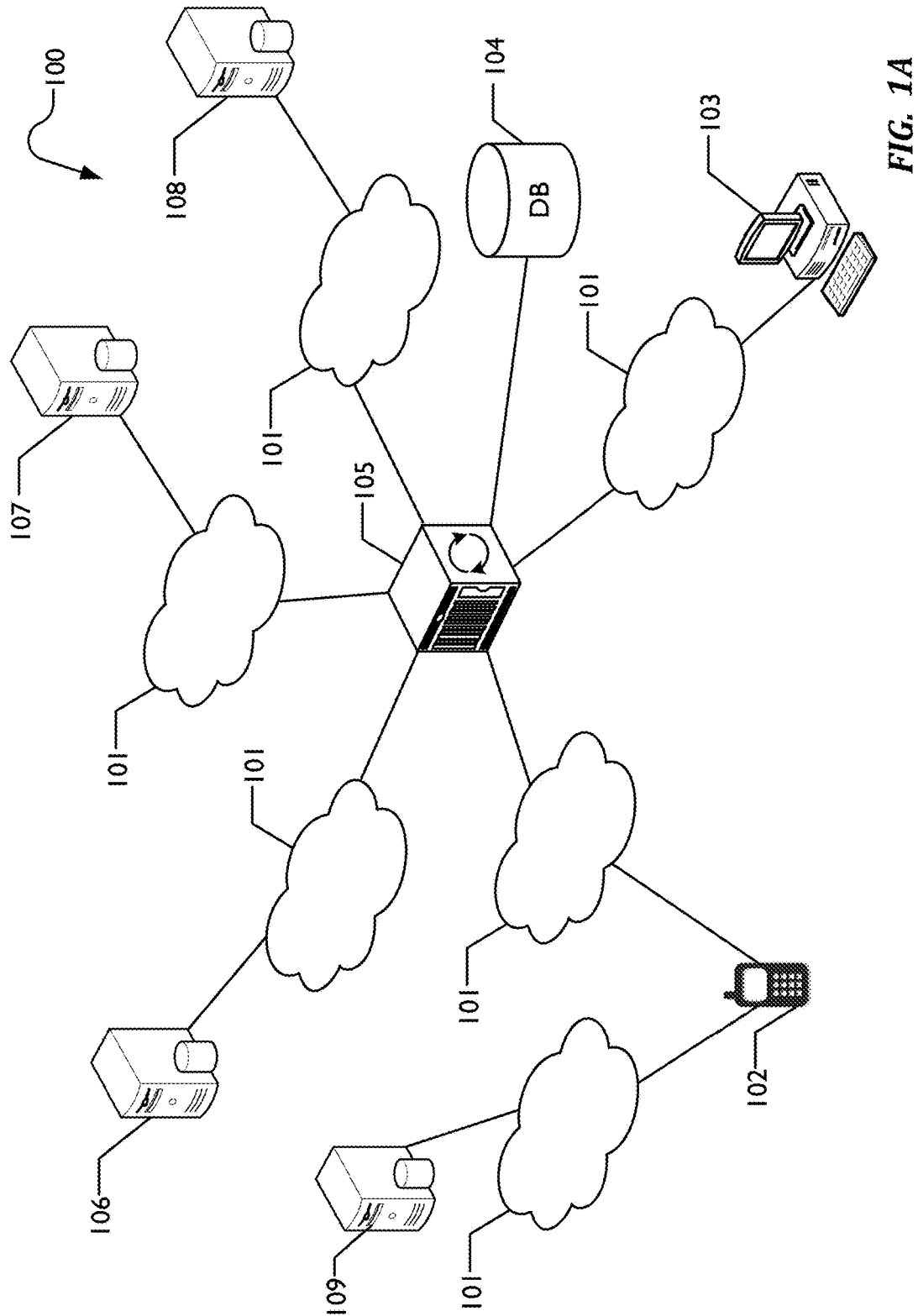
FIG. 1A is a block diagram illustrating a server-entry point network architecture infrastructure, according to one or more disclosed embodiments.

Disclosed are systems, methods and computer readable media for creating user-defined custom access permission settings for files stored in encoded media file types, e.g., audio files such as MP3 files, which settings may serve to limit the listening and/or sharing privileges for the files (or portions of the files) on a per-recipient or per-group basis. More particularly, but not by way of limitation, this disclosure relates to systems, methods, and computer readable media to permit users of the access permission setting system to obfuscate certain content which corresponds to particular portions of an audio file and then "hide" (and optionally encrypt) the redacted content within one or more parts of the data structure of the audio file type. The recipient receiving the audio file may then, if an authorized recipient and using an authorized playback application, extract the hidden content within the file, decrypt the hidden content (if necessary), and then reconstruct some or all of the content of the audio file into its original form.

According to some embodiments described herein, one or more portions or sub-streams within a bitstream, may be represented in an individual stream container that is transmitted within the APC-protected version of the encoded media file. Each of the protected portions in a bitstream may be obfuscated as desired, such that the listener either cannot hear the protected portions. Finally, the APC-protected version of the encoded media file may be re-encoded, including the obfuscated protected portions, and packaged along with various stream containers (e.g., for playback in one or more audio channels) that will be used by authorized recipients to reconstruct some or all of the original content of the encoded media file, e.g., by packaging such stream containers within the encoded media file's structure.

When received by an authorized recipient, each encrypted stream container embedded in the encoded media file's structure may be decrypted (i.e., if the protected portion was encrypted by the protector, and if the recipient of the file is authorized to decrypt the particular portion or bitstream).

As may now be understood, when played back outside of an authorized player application (or by a recipient that is not authorized to decrypt any of the protection regions), the listener will simply hear the original encoded media file, which will have been compressed with the protected regions being obfuscated. This process may thus allow for the reconstruction of the original content in a secure fashion that enforces the sender's original recipient-specific privacy intentions for the various portions of the audio file, while still allowing other unauthorized-recipients to listen to the redacted version of the file in standard playback applications for the particular file type in question.

Terms

In order to enhance understanding of this disclosure and the various embodiments discussed, non-limiting explanations of various terms used in this disclosure are provided below.

An audio stream is a bitstream containing audio (sound) information. A bitstream (or bit-stream), also known as binary sequence, is a sequence of bits. Embodiments of this disclosure include systems and methods of secreting information within an audio bitstream. The methods set forth herein can be applied to files which contain audio bitstreams. Audio bitstreams can exist as direct audio files or as layers inside of other files, such as videos for example. Although the examples described involve audio streams, various systems and methods can be applied to other bitstreams as well.

Audio can be stored in audio files according to various formats. An audio file format is a file format for storing digital audio data on a computer system. The bit layout of the audio data (excluding metadata) is called the audio coding format and can be uncompressed, or compressed to reduce the file size, often using lossy compression. The data can be a raw bitstream in an audio coding format, or the data can be embedded in a container format or an audio data format with defined storage layer. A codec performs the encoding and decoding of the raw audio data while this encoded data is (usually) stored in a container file. Although most audio file formats support only one type of audio coding data (created with an audio coder), a multimedia container format (as Matroska or AVI) may support multiple types of audio and video data.

Embodiments of this disclosure pertain to secreting data within audio files having various formats, including uncompressed formats, such as MP3, AIFF, AU or raw header-less PCM, lossless compression formats, such as FLAC, Monkey's Audio (filename extension .ape), MP3Pack (filename extension .wv), TTA, ATRAC Advanced Lossless, ALAC (filename extension .m4a), MPEG-4 SLS, MPEG-4 ALS, MPEG-4 DST, Windows Media Audio Lossless (WMA Lossless), and Shorten (SHN), and formats with lossy compression, such as Opus, MP3, Vorbis, Musepack, AAC, ATRAC and Windows Media Audio Lossy (WMA lossy).

Embodiments of this disclosure include audio coding using techniques which utilize steganography. An audio coding format (or sometimes audio compression format) is a content representation format for storage or transmission of digital audio (such as in digital television, digital radio and in audio and video files). Examples of audio coding formats include MP3, AAC, Vorbis, FLAC, and Opus. A specific software or hardware implementation capable of audio compression and decompression to/from a specific audio coding format is called an audio codec. AN example of an audio codec is LAME, which is one of several different codecs for encoding and decoding audio in the MP3 audio coding format.

Steganography is the practice of concealing a file, message, image, or video within another file, message, image, or video. Whereas cryptography is the practice of solely protecting the contents of a file or message, steganography can include concealing the fact that a secret message is being sent as well as concealing the contents of the file or message. Steganography includes the concealment of information within computer files, such as audio and audio-visual files. Using steganography, the encrypted data is present in the file, but is not audible to someone who is not authorized to hear the clip.

Embodiments of this disclosure utilize a stenographic-enable APC encryption engine to encrypt a section of a stream of audio data, and hide the section from certain users such that when they play the audio data they are not able to hear the encrypted section.

Referring now to FIG. 1A, a server-entry point network architecture infrastructure 100 is shown schematically. Infrastructure 100 contains computer networks 101. Computer networks 101 include many different types of computer networks available today, such as the Internet, a corporate network, or a Local Area Network (LAN). Each of these networks can contain wired or wireless devices and operate using any number of network protocols (e.g., TCP/IP). Networks 101 may be connected to various gateways and routers, connecting various machines to one another, represented, e.g., by sync server 105, end user computers 103, mobile phones 102, and computer servers 106-109. In some embodiments, end user computers 103 may not be capable of receiving SMS text messages, whereas mobile phones 102 are capable of receiving SMS text messages. Also shown in infrastructure 100 is a cellular network 101 for use with mobile communication devices. As is known in the art, mobile cellular networks support mobile phones and many other types of devices (e.g., tablet computers not shown). Mobile devices in the infrastructure 100 are illustrated as mobile phone 102. Sync server 105, in connection with database(s) 104, may serve as the central "brains" and data repository, respectively, for the adaptive privacy control system to be described herein. In the server-entry point network architecture infrastructure 100 of FIG. 1A, centralized sync server 105 may be responsible for querying and obtaining all the messages from the various communication sources for individual users of the system, communicating public keys, applying adaptive privacy controls to lossy files or objects, which may be communicated to one or more users of the system synchronized with the data on the various third party communication servers that the system is in communication with. Database(s) 104 may be used to store local copies of messages sent and received by users of the system, as well as individual documents associated with a particular user, which may or may not also be associated with particular communications of the users. As such, the database portion allotted to a particular user will contain a record of all communications in any form to and from the user.

Server 106 in the server-entry point network architecture infrastructure 100 of FIG. 1A represents a third party email server (e.g., a GOOGLE®). (GOOGLE is a registered service mark of Google Inc.) Third party email server 106 may be periodically pinged by sync server 105 to determine whether particular users of a multi-protocol, multi-format communication composition and inbox feed system described herein have received any new email messages via the particular third-party email services. Server 107 represents a third party instant message server Third party instant messaging server 107 may also be periodically pinged by sync server 105 to determine whether particular users of the multi-protocol, multi-format communication composition and inbox feed system described herein have received any new instant messages via the particular third-party instant messaging services. Similarly, server 108 represents a third party social network server (e.g., a FACEBOOK® or TWITTER® server). (FACEBOOK is a registered trademark of Facebook, Inc. TWITTER is a registered service mark of Twitter, Inc.) Third party social network server 108 may also be periodically pinged by sync server 105 to determine whether particular users of the multi-protocol, multi-format communication composition and inbox feed system described herein have received any new social network messages via the particular third-party social network services. It is to be understood that, in a "push-based" system, third party servers may push notifications to sync server 105 directly, thus eliminating the need for sync server 105 to periodically ping the third party servers. Finally, server 109 represents a cellular service provider's server. Such servers may be used to manage the sending and receiving of messages (e.g., email or SMS text messages) to users of mobile devices on the provider's cellular network. Cellular service provider servers may also be used: 1) to provide geo-fencing for location and movement determination; 2) for data transference; and/or 3) for live telephony (i.e., actually answering and making phone calls with a user's client device). In situations where two 'on-network' or 'on-system' users are communicating with one another via the multi-protocol communication system itself, such communications may occur entirely via sync server 105, and third party servers 106-109 may not need to be contacted. An 'on-network' user may include a user that has set up a user profile on sync server 105 specifying preferred communications formats and/or protocols for a given communication session/message (e.g., if the recipient is in an area with a poor service signal, lower bit-rate communication formats, such as text, may be favored over higher bit-rate communications formats, such as video or voice), and/or economic considerations of format/protocol choice to the recipient and/or sender (e.g., if SMS messages would charge the recipient an additional fee from his or her provider, other protocols, such as email, may be chosen instead).

Figure 1B:
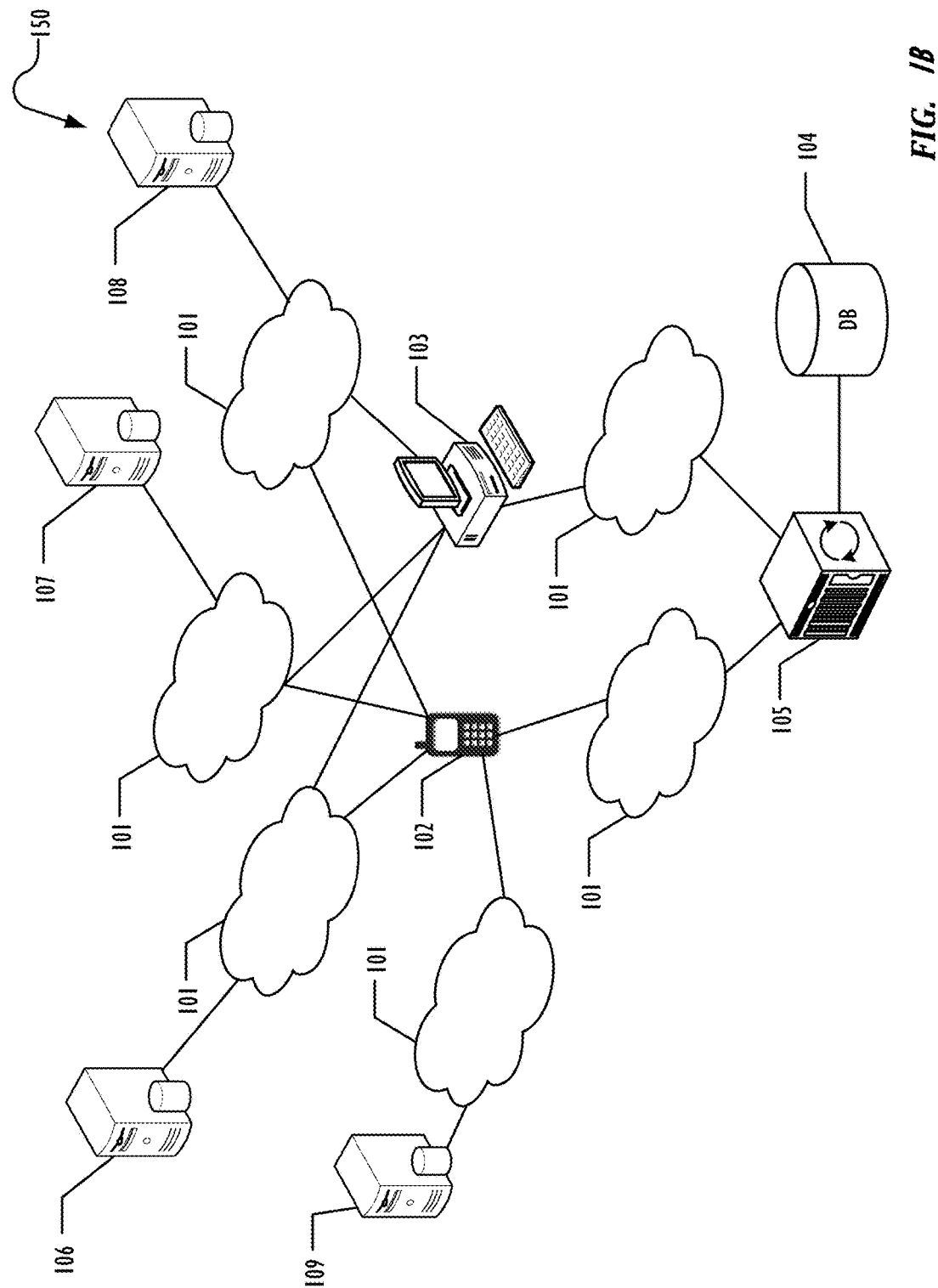
FIG. 1B is a block diagram illustrating a client-entry point network architecture infrastructure, according to one or more disclosed embodiments.

Referring now to FIG. 1B, a client-entry point network architecture infrastructure 150 is shown schematically. Similar to infrastructure 100 shown in FIG. 1A, infrastructure 150 contains computer networks 101. Computer networks 101 may again include many different types of computer networks available today, such as the Internet, a corporate network, or a Local Area Network (LAN). However, unlike the server-centric infrastructure 100 shown in FIG. 1A, infrastructure 150 is a client-centric architecture. Thus, individual client devices, such as end user computers 103 and mobile phones 102 may be used to query the various third party computer servers 106-109 to retrieve the various third party email, IM, social network, and other messages for the user of the client device. Such a system has the benefit that there may be less delay in receiving messages than in a system where a central server is responsible for authorizing and pulling communications for many users simultaneously. Also, a client-entry point system may place less storage and processing responsibilities on the central multi-protocol, multi-format communication composition and inbox feed system's server computers since the various tasks may be distributed over a large number of client devices. Further, a client-entry point system may lend itself well to a true, "zero knowledge" privacy enforcement scheme. In infrastructure 150, the client devices may also be connected via the network to the central sync server 105 and database 104. For example, central sync server 105 and database 104 may be used by the client devices to reduce the amount of storage space needed on-board the client devices to store communications-related content and/or to keep all of a user's devices synchronized with the latest communication-related information and content related to the user. It is to be understood that, in a "push-based" system, third party servers may push notifications to end user computers 102 and mobile phones 103 directly, thus eliminating the need for these devices to periodically ping the third party servers.

Figure 2A:
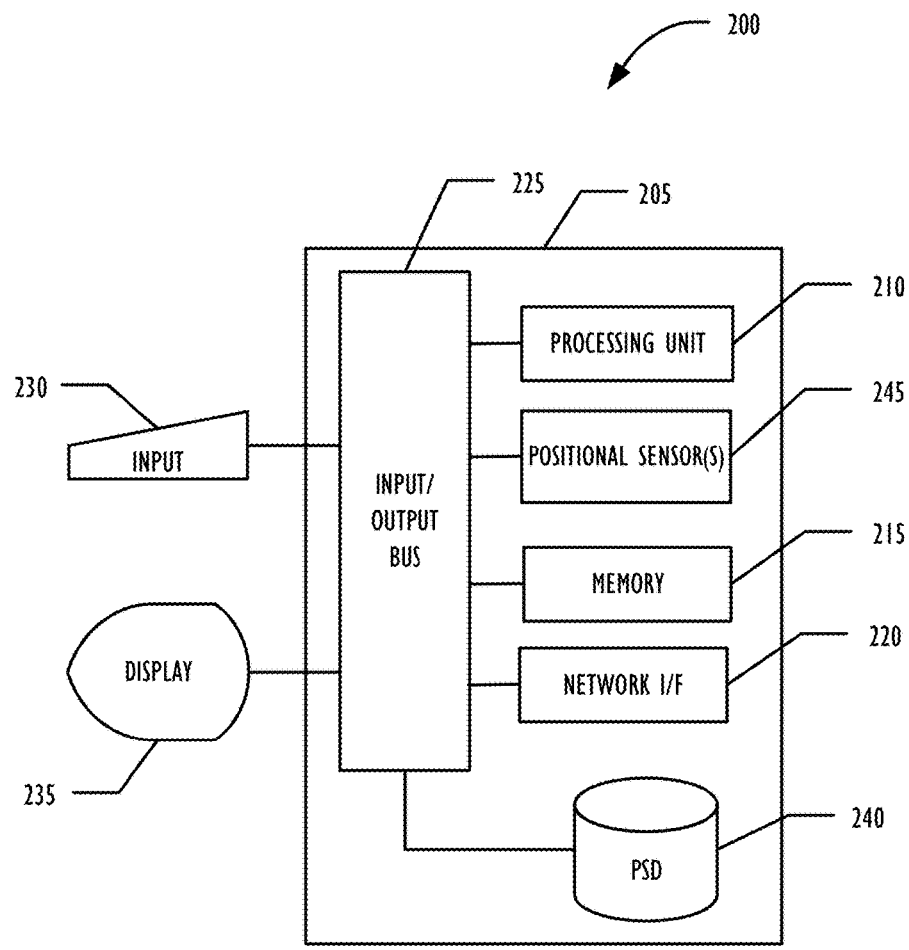
FIG. 2A is a block diagram illustrating a computer that could be used to execute the cloud-based user defined APC approaches described herein according to one or more of disclosed embodiments.

Referring now to FIG. 2A, an example processing device 200 for use in the communication systems described herein according to one embodiment is illustrated in block diagram form. Processing device 200 may serve in, e.g., a mobile phone 102, end user computer 103, sync server 105, or a server computer 106-109. Example processing device 200 comprises a system unit 205 which may be optionally connected to an input device 230 (e.g., keyboard, mouse, touch screen, etc.) and playback 235. A program storage device (PSD) 240 (sometimes referred to as a hard disk, flash memory, or non-transitory computer readable medium) is included with the system unit 205. Also included with system unit 205 may be a network interface 220 for communication via a network (either cellular or computer) with other mobile and/or embedded devices (not shown). Network interface 220 may be included within system unit 205 or be external to system unit 205. In either case, system unit 205 will be communicatively coupled to network interface 220. Program storage device 240 represents any form of non-volatile storage including, but not limited to, all forms of optical and magnetic memory, including solid-state storage elements, including removable media, and may be included within system unit 205 or be external to system unit 205. Program storage device 240 may be used for storage of software to control system unit 205, data for use by the processing device 200, or both.

System unit 205 may be programmed to perform methods in accordance with this disclosure. System unit 205 comprises one or more processing units, input-output (I/O) bus 225 and memory 215. Access to memory 215 can be accomplished using the communication bus 225. Processing unit 210 may include any programmable controller device including, for example, a mainframe processor, a mobile phone processor, or, as examples, one or more members of the INTEL® ATOM™, INTEL® XEON™, and INTEL® CORE™ processor families from Intel Corporation and the Cortex and ARM processor families from ARM. (INTEL, INTEL ATOM, XEON, and CORE are trademarks of the Intel Corporation. CORTEX is a registered trademark of the ARM Limited Corporation. ARM is a registered trademark of the ARM Limited Company). Memory 215 may include one or more memory modules and comprise random access memory (RAM), read only memory (ROM), programmable read only memory (PROM), programmable read-write memory, and solid-state memory. As also shown in FIG. 2A, system unit 205 may also include one or more positional sensors 245, which may comprise an accelerometer, gyrometer, global positioning system (GPS) device, or the like and, which, may be used to track the movement of user client devices.

Figure 2B:
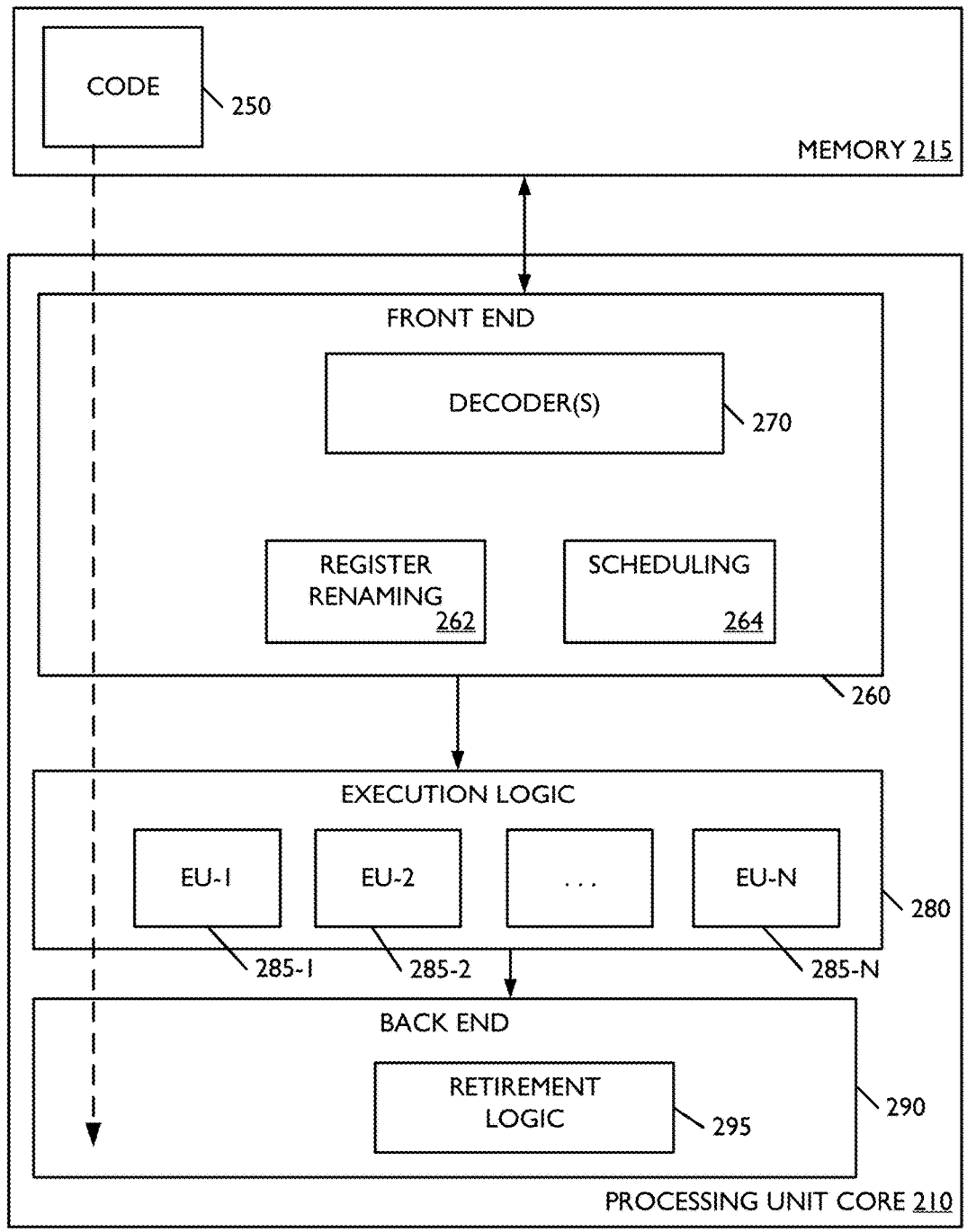
FIG. 2B is a block diagram illustrating a processor core, which may reside on a computer according to one or more of disclosed embodiments.

Referring now to FIG. 2B, a processing unit core 210 is illustrated in further detail, according to one embodiment. Processing unit core 210 may be the core for any type of processor, such as a micro-processor, an embedded processor, a digital signal processor (DSP), a network processor, or other device to execute code. Although only one processing unit core 210 is illustrated in FIG. 2B, a processing element may alternatively include more than one of the processing unit core 210 illustrated in FIG. 2B. Processing unit core 210 may be a single-threaded core or, for at least one embodiment, the processing unit core 210 may be multithreaded, in that, it may include more than one hardware thread context (or "logical processor") per core.

FIG. 2B also illustrates a memory 215 coupled to the processing unit core 210. The memory 215 may be any of a wide variety of memories (including various layers of memory hierarchy. The memory 215 may include one or more code instruction(s) 250 to be executed by the processing unit core 210. The processing unit core 210 follows a program sequence of instructions indicated by the code 250. Each instruction enters a front end portion 260 and is processed by one or more decoders 270. The decoder may generate as its output a micro operation such as a fixed width micro operation in a predefined format, or may generate other instructions, microinstructions, or control signals, which reflect the original code instruction. The front end 260 may also include register renaming logic 262 and scheduling logic 264, which generally allocate resources and queue the operation corresponding to the convert instruction for execution.

The processing unit core 210 is shown including execution logic 280 having a set of execution units 285-1 through 285-N. Some embodiments may include a number of execution units dedicated to specific functions or sets of functions. Other embodiments may include only one execution unit or one execution unit that can perform a particular function. The execution logic 280 performs the operations specified by code instructions.

After completion of execution of the operations specified by the code instructions, back end logic 290 retires the instructions of the code 250. In one embodiment, the processing unit core 210 allows out of order execution but requires in order retirement of instructions. Retirement logic 295 may take a variety of forms (e.g., re-order buffers or the like). In this manner, the processing unit core 210 is transformed during execution of the code 250, at least in terms of the output generated by the decoder, the hardware registers and tables utilized by the register renaming logic 262, and any registers (not shown) modified by the execution logic 280.

Although not illustrated in FIG. 2B, a processing element may include other elements on chip with the processing unit core 210. For example, a processing element may include memory control logic along with the processing unit core 210. The processing element may include I/O control logic and/or may include I/O control logic integrated with memory control logic. The processing element may also include one or more caches.

File-Level and Sub-File-Level Access Permission Setting Scheme with Custom, Recipient-Based Privacy Settings According to some embodiments of a system for providing Adaptive Privacy Controls (APC), file-level access permission setting may be implemented. For example, in one scenario, a user may wish to share a file containing audio information with a first colleague, but not allow that information to be available to other colleagues who may receive the file from the first colleague. The first colleague may be an 'on-system' recipient or an 'off-system' recipient. In such a scenario, User A may use the access permission setting system to send an obfuscated audio file (e.g., by attaching the file to an email and sending using SMTP) to the first colleague, User B, while selecting the appropriate steganographic attributes in the sent file to limit the access of User B (and other users who may play the container file) to only specific portions of the file's content. In one embodiment, User A may create an edited copy of the original file, referred to herein as a "secure" file. Securing may include any of a number of techniques to "mask" the true contents of the file, e.g.: encrypting one or more portions of a bitstream, encoding an encrypted portion onto an inaudible high frequency control wave, and configuring the files architecture such that a portion of a bitstream from which encrypted audio is drawn are replaced by different audio during playback. If in addition to concealment, encryption is also desired, any compatible encryption process may be used, e.g., a public/private key process, with the specific public key being provided by the device, the recipient user, or another central authority to create an encrypted file. User B can then receive a typical message with the audio file attached, which includes the hidden (and optionally encrypted) true copy of the obfuscated portions of the file. In some embodiments, a part of the data structure of the file may also include a deep-link for validating the receiving user's credentials, as well information for creating a so-called "phantom user identifier," e.g., a temporary authorized identifier that may be used by an 'off-system' user to authenticate himself or herself for the purposes of listening to a particular piece(s) of protected content. The deep-link may be used to validate user credentials, as well as to audibly playback the hidden (and/or encrypted) obfuscated contents of the file in a compatible authorized playback application.

User B may be an 'on-network' or 'on-system' recipient or an 'off-system recipient'. If User B is an 'on-network' recipient, and the hidden "true" contents of the obfuscated portions of the file are also encrypted, the system may use one (or more) of a number of encryption schemes to ensure that only authorized recipients are able to play the true contents of the file. For example, the bits of the hidden "true" content of the obfuscated portions may be encrypted with different keys for different people/groups. Alternately, the bits may be encrypted once with a single key. The single key may then be encrypted many times with different per-user or per-device keys and stored within the same MP3 container thereby saving space. Alternately, the keys may be stored on the server and recalled dynamically, or they may be sent via public/private key exchange. Finally, the bits may be encrypted using Key-Policy Attribute Based Encryption (KP-ABE), regular public/private key, AES keys, or the like.

A situation in which sub-document-level access permission setting may be employed in the sharing of audio files or audio parts of files (e.g., audio-visual files) is the situation in which specific portions of the media content require selective censorship, redaction, or other protection for certain recipients, so as to maintain desired privacy or security levels on a per-recipient level. In one scenario, User A, the sharer, may want to share a recording of a witness's testimony, but certain parts of the testimony may concern classified information that the sharer (e.g., the government) does not want the listener (e.g., citizens) to learn about. A user may attach the recording to a message in an authorized 'on-system' application and use the application's selection capabilities to "block-out," or redact, the classified sub-portions of the audio. Prior to sending a MP3 file, a user could instruct the system to allow the recipient to hear the uncensored file after receipt and decryption in an authorized playback application, while only allowing a different user playback the censored version of the MP3 file. Embodiments of a system for providing Adaptive Privacy Controls as discussed above are discussed in further detail below with respect to FIGS. 3-15.

For the exemplary file-level privacy control scenarios described above, the application can present a graphical user interface (GUI) depicting the file in question (e.g., via a playback/streaming application, etc.) to the sender of the file. The sender can then use any desired form of selection input (e.g., touch gestures, mouse gestures, etc.) to indicate which content should be protected and/or access-controlled, e.g., via hiding and/or encryption, such as by timestamping portions of recorded audio. Those selections will be processed locally or sent to a central server (depending on client capabilities), whereby the system will process the object's original source code (e.g. in MP3 format, etc.), corresponding to the section or sections matching the user selection, in order to enforce the user's selection of protected and/or access-controlled portions. Selection of portions of an audio bitstream can also be made "on the fly" during capture of the recorded audio. For example, a meeting participant might press a "mute" button at one endpoint of a teleconference.

FIG. 3A and FIG. 3B illustrate an example of selecting a portion of an audio file for obfuscation. FIG. 3A shows an artist 302 whose singing is captured 304 as a bitstream 306 from after being picked up by microphone 306. FIG. 3B shows a GUI 310 of a playback/recording device (not shown). During playback, or on the fly, the user of the device can press button 312 at time 5.37 and release the button 312 at time 7.5 as shown. The segment 314 of bitstream 306 marked by the user can be cropped and obfuscated as described herein. This might be appropriate where, for example the singer happens to insert a curse word into an otherwise lovely song. The user may wish to share the song (embodied in bitstream 306) with a relative who may prefer to hear the song without the cursing.

The section(s) (e.g., 314) in question may then be isolated at the code level and, if desired, encrypted (e.g., using any one of standard encryption practices, such as asymmetric public/private key, or more advanced Key-Policy Attribute Based Encryption, i.e., "KP-ABE," etc.). The selected sections are identified at the code level. Unsuccessful retrieval or decryption will result in the recipient only hearing the obfuscated file that does not enable rendering of the entire file as originally recorded.

Figure 4:
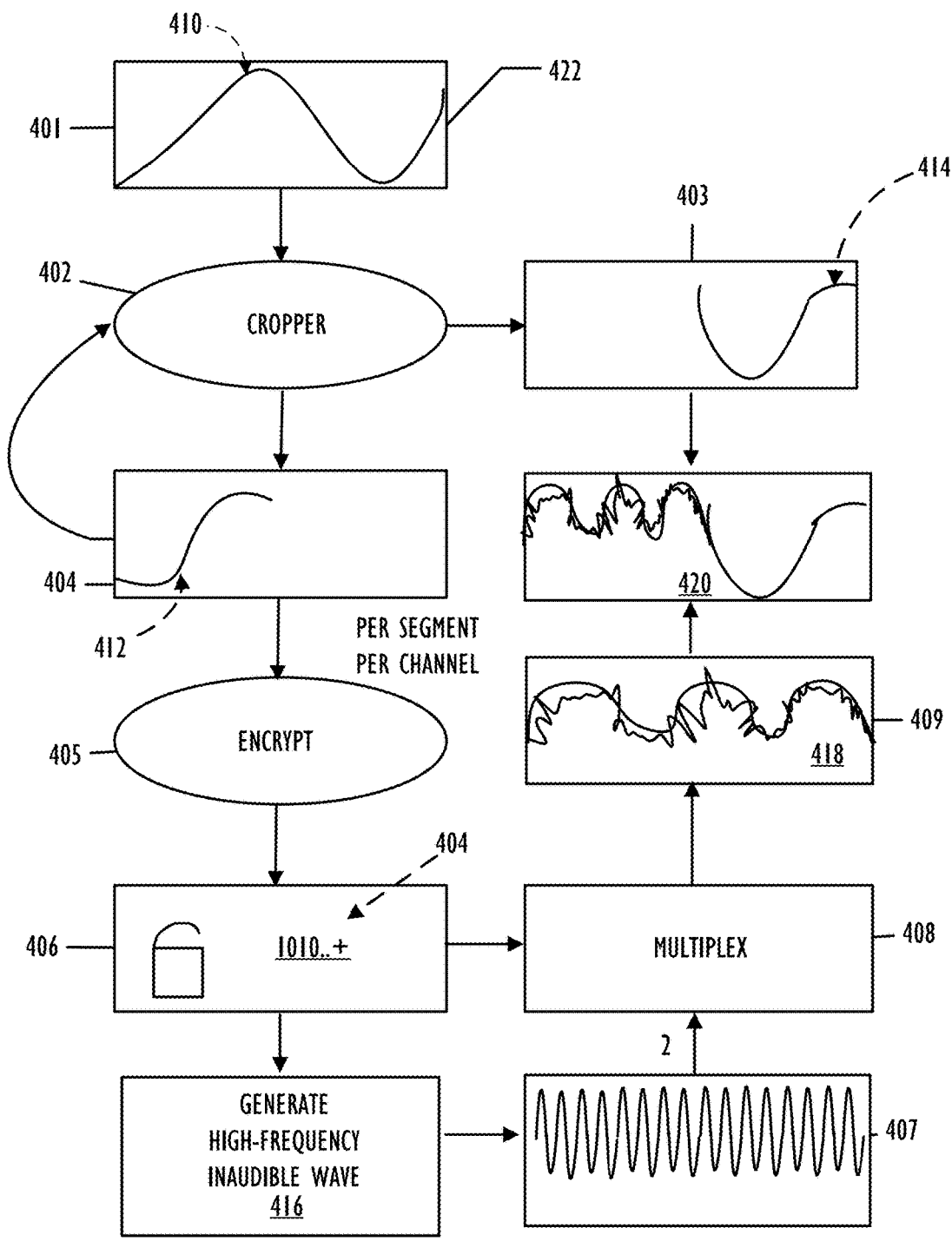
FIG. 4 is a flowchart of a method of steganographic processing.

FIG. 4 is a flowchart of a method 400 of steganographic processing (SP). At step 01 a file 422 containing a bitstream (bitstream-1) 410 corresponding to audio is designated for SP (see FIG. 3). The audio of file 422 could, for example, be audio captured by a microphone during a teleconference. At step 402 bitstream-1 passes to a cropper, (bitstream-1 can be a segment of a larger stream within file 422). The cropper crops bitstream-2 412 from bitstream-1, leaving bitstream-3 414. Bitstream-2 412 is then encrypted at step 405, yielding bitstream-4 404 (encrypted version of bitstream-2) at step 406. At step 416 the APC generates an inaudible tone corresponding to a high frequency sine wave 407. The encrypted bitstream 404 is then multiplexed 408 with (inaudible) sine wave 407. That is, the value of each bit in bitstream-4 is added to a corresponding value in sine wave 407, producing bitstream-5 409 at step 418. Bitstream-5 409 represents an inaudible tone concealing encoded bitstream-2 within it. Bitstream 5 409 is a "secure bitstream." That is, it is a bitstream which conceals encrypted information. Bitstream-5 409 is concatenated with bitstream-3 414 at step 420, producing a "secure file" (500). That is, a file containing one or more secure bitstreams.

As intimated above, cropping 402 can be done by a user during capture of audio. Cropping can be done while live streaming by chunking the buffer. Cropping also can be done during playback. Cropping during playback can be used to redact portions of audio for a certain audience, as noted with regard to FIG. 3.

Figure 5A:
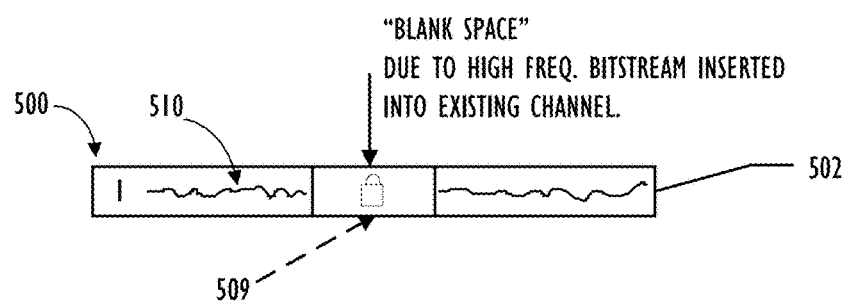
FIG. 5A illustrates a secure file containing a single secure section produced by the method of FIG. 4 being carried by a channel.

FIG. 5A illustrates a secure file 500 produced by method 400 being carried by channel 502. Secure file 500 can be seen to contain secure bitstream 509 within bitstream 510. During playback of secure file 500, the secure portion 509 of bitstream 510 will be inaudible. That is, in the embodiment of FIG. 5A a person listening to file 500 will hear silence when secure portion 509 is played, while the remainder of the file 500 will be heard as regular audio, such as audio captured by a microphone (e.g., 308).

Figure 5B:
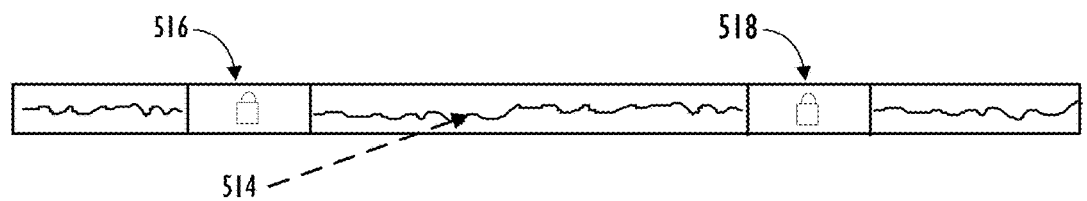
FIG. 5B illustrates a secure file containing two secure sections produced by the method of FIG. 4 being carried by a channel.

The discussion thus far has been concerned with concealing secure information inside a single bitstream (510) within a single channel 502. It is, however, possible to conceal encrypted information within more than one segment of a bitstream as illustrated in FIG. 5B. This can be done by cropping the desired segments from the bitstream in question (e.g., 514), and then encrypting and multiplexing each as described above, and then inserting (420) each secure bitstream 516, 518 into its corresponding cropped portion (415).

Figure 5C:
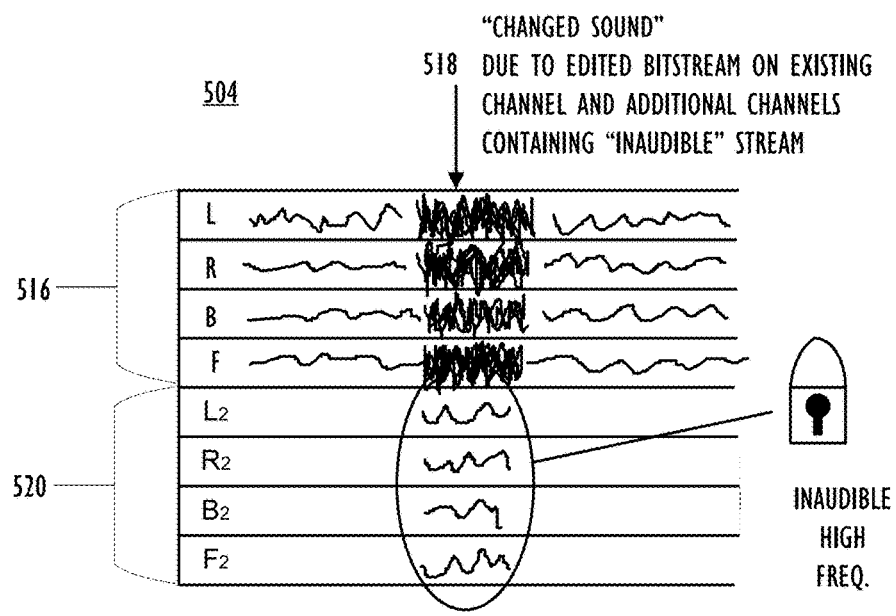
FIG. 5C illustrates an eight channel playback environment.

FIG. 5C illustrates an eight channel playback environment 504. The channels are designated left (L), right (R), center-front back (B), center-front left (F), sub-left (L2), sub-right (R2), lower-back (B2) and lower-front (F2). The upper four channels 516 correspond to a file containing four channels of captured audio. The darkened central regions 518 in each of the four streams 516 can be secure sections (e.g., 509) as described above, or can, instead be filled with other audio, such as a "buzz," "bleep" or the like. During encoding of an audio file, it is possible to create a "shadow" stream 520 corresponding to each stream of audio, with shadow streams containing only the secure sections (e.g., 509) corresponding to the cropped portions of each bitstream. This would normally be done when the cropped portions of the audio streams (e.g., 514) have been filled with "filler audio," such as the buzz or bleep, etc. In FIG. 5C, such shadow streams 518 are shown in channels L2, R2, B2 and F2.

Each of these channels L2, R2, B2 and F2 can themselves be locked against unauthorized access. When the secure file containing these channels is played on a player which is not authorized to access these channels, the listener will hear the filler audio. On the other hand, when the secure file is played on a properly configured player, the secure sections will be unpacked and recomposed and the authorized listener will hear the audio in the secure sections as it was originally captured. During playback, the APC will subtract the sine wave values 407 from the secure stream 500, revealing the encrypted message. The correct high frequency wave 407 thus serves as an additional layer of protection. In at least one embodiment, the control frequency of the sine wave 407 can be one that is lower than what is perceptible by people.

The APC will then decrypt the message. A properly configured playback device will detect key headers and unpack and recompose the layers into each stream as it is playing back, as discussed in regard to FIG. 12B below.

It is often the case that a single audio file will contain multiple bitstreams to be played concurrently on multiple parallel channels. In that instance, method 400 would be applied to each bitstream (channel) requiring SP. The method 400 can thus be understood to apply once per segment per channel, ((App/Seg)/Chn). (See FIG. 4.)

In at least one embodiment, the APC uses a layering system which allows flexibility in adjusting to the primary layer as a way to obfuscate and hide the primary content. In at least one embodiment, the bits of the cropped bitstream can be sprinkled throughout the main bitstream, through application of one or more algorithms. That is, each bit in the concealed bitstream will be added to a bit within the main bitstream. During authorized playback, the player will remove these bits and recompose the message. During playback by a player which does not have permission to retrieve and reconstitute the concealed bitstream(s), the columnated bits will, if they are even noticed, will be perceived as extremely minor distortions in the audio.

Figure 5D:
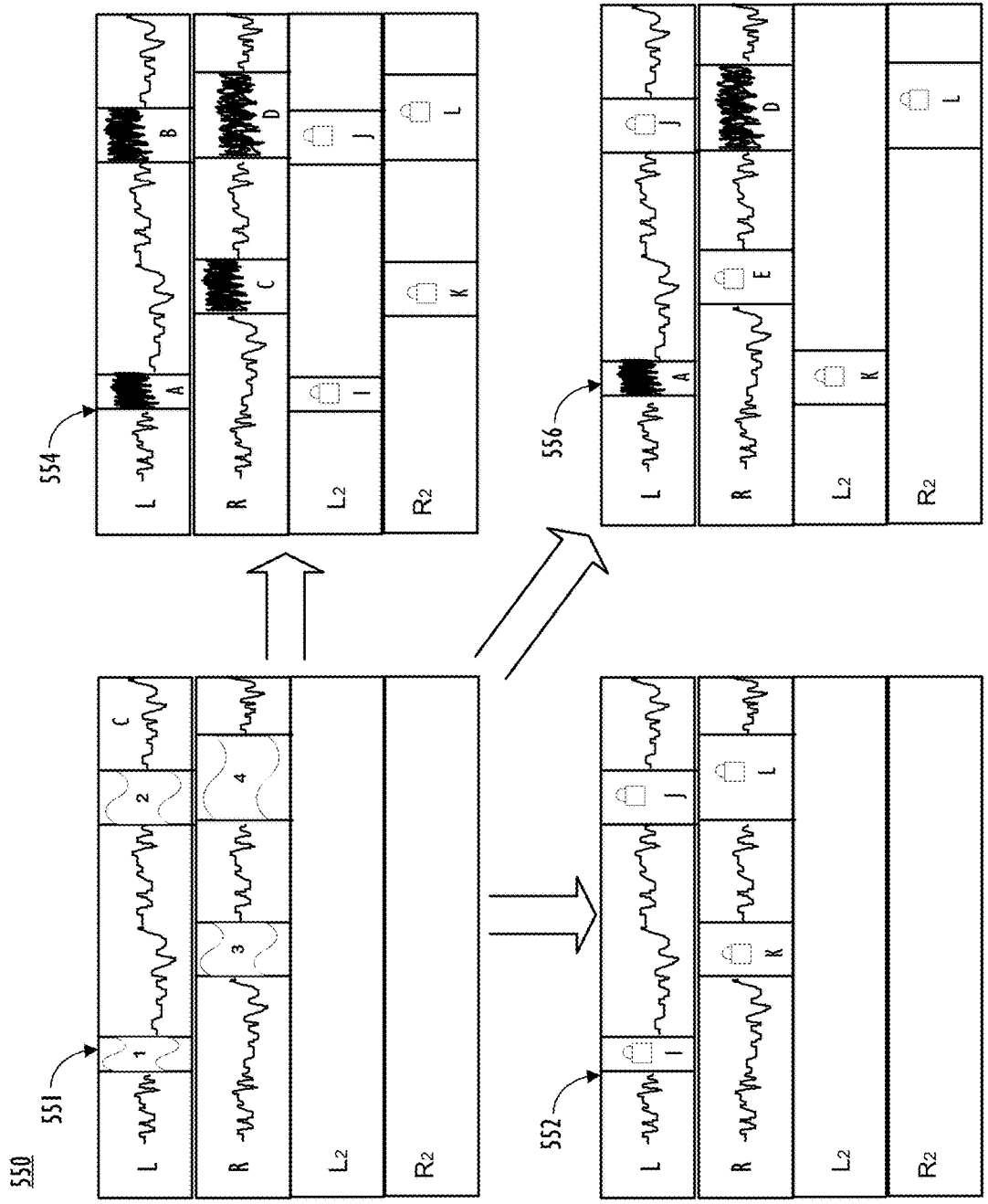
FIG. 5D illustrates an advanced multi-layered steganographic process.

FIG. 5D illustrates an advanced multi-layered steganographic process 550. As shown, a four channel device 551 has captured two bitstreams, one in channel L and one in channel R. There are four sub bitstreams that a user wishes to obfuscate, two in channel L and two in channel R. Assume for ease of explanation that clip-1 is two second long, clip-2 is two seconds long, and so forth. In the multilayer method depicted, each of the four audio clips is cropped. Each of the four clips is then encrypted. The bits of the four clips are then transposed algorithmically, using a pseudo random number generator for example, yielding four 'super-encrypted' bitstreams having the same lengths as the initial four, each having jumbled bits from multiple clips. Thus even if an unauthorized person somehow managed to decrypt the four streams, they would still be unintelligible without the appropriate inverse algorithm necessary to put the individual bits in their appropriate location. The super-encrypted bitstreams are then multiplexed with one or more high frequency carrier waves, yielding secure clips I, J, K and L. These secure clips can be concatenated with the remaining streams as shown in block 552. Alternately, the secure clips (which are inaudible due to the control wave), can also be inserted into extra channels L2 and R2 as shown in block 554, with filler sound cleaved into the bitstreams of channel L and R (A, B, C, D). Furthermore, as shown in block 556, it is also possible to place some of the secure clips (e.g., K, L) in extra channels, and some (E, J) in the first two channels. As discussed previously, filler sound clips can be introduced in the areas where the secure clips have been removed, (e.g., A for K and D for L).

Figure 6A:
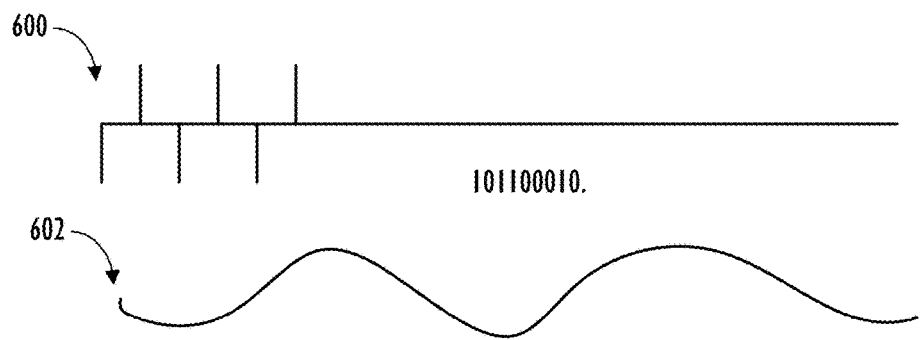
FIG. 6A illustrates a bitstream whose values are to be columnated with the values of control MP3 602.

FIG. 6A illustrates a bitstream 600 whose values are to be columnated with the values of control wave 602. The control wave 602 will be multiplexed with the data of bitstream 600 (the payload), producing a new data set, effectively a modified control wave (604). Multiplexing can include normalizing this resultant data set so that none of the individual bits of data will be clipped (exceed the allowable range) or fall below the inaudible level. Bitstream IDs can also be appended to bitstreams which have been modified as discussed. Such IDs can be recognizable by an authorized playback device (e.g., APC) as queues for decryption, unpacking etc.

Figure 6B:
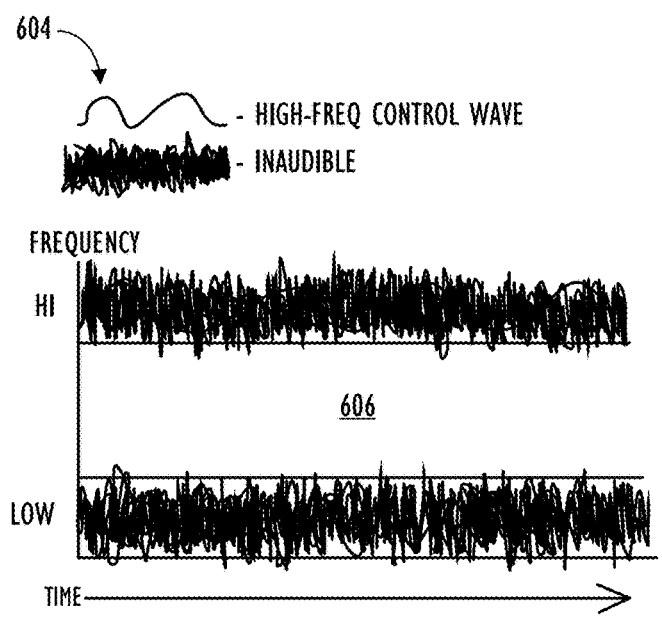
As shown in FIG. 6B, in at least one embodiment, the resulting columnated bitstream 604 is normalized in order to avoid clipping (going above allowed values) and falling into the range 606 of sound audible to humans.

As shown in FIG. 6B, in at least one embodiment, the resulting columnated bitstream 604 is normalized in order to avoid clipping (going above allowed values) and falling into the range 606 of sound audible to humans. Data that is clipped is lost, which is undesirable.

In at least one embodiment, the APC can look for specified words or phrases for redaction using voice recognition.

It should be noted that the form of steganography used can be swappable, just like the encryption method is swappable. Various encryption standards can be used. Similarly the APC can use many different forms of steganography to isolate and change the audio frequency of the data concealed as described herein.

Figure 7:
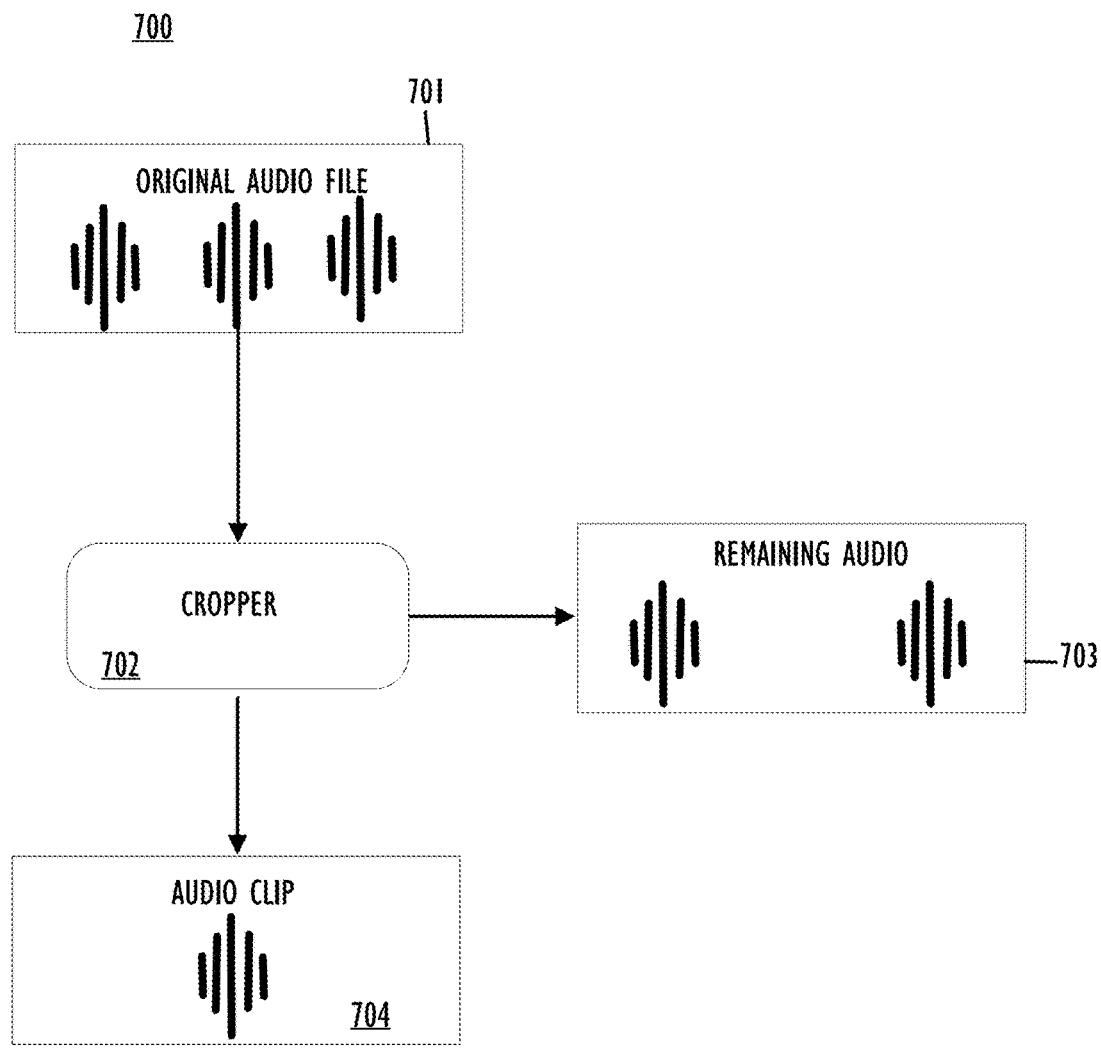
FIG. 7 is a flowchart depicting a method 700 of cropping. At step 701 an audio file is designated for SP.

FIG. 7 is a flowchart depicting a method 700 of cropping. At step 701 an audio file is designated for SP. A user can select a portion of audio that the user wishes to secure against unauthorized access. The user will select start and end timestamps of the audio file which they want to restrict. At step 702 the selected audio segment is extracted leaving remaining audio 703, and producing audio clip 704 for further processing.

Figure 8:
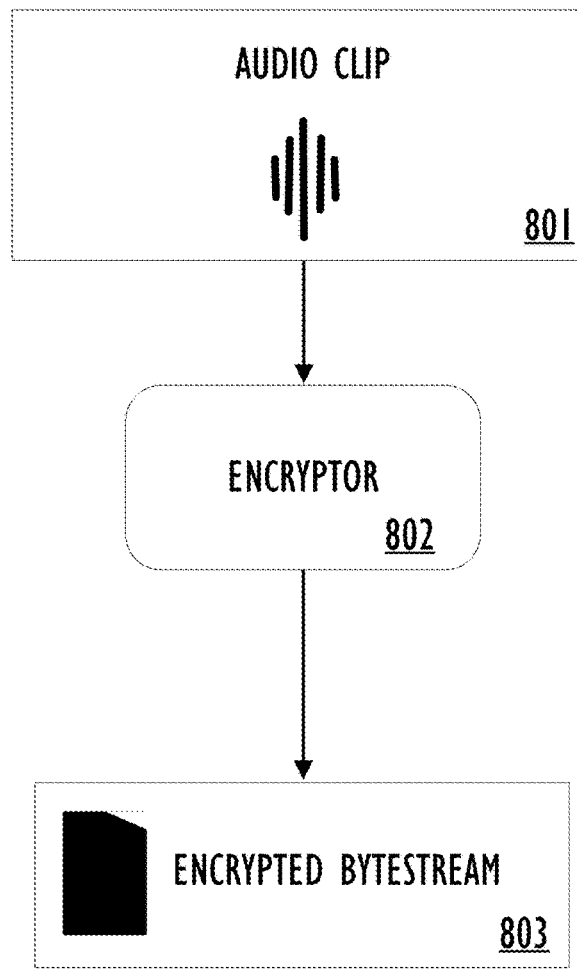
FIG. 8 illustrates an encryption method 800.

FIG. 8 illustrates an encryption method 800. At step 801 an audio clip (e.g., 704) is designated for encryption. At step 802 the APC accesses (such as by retrieval, or receipt) encryption keys and uses them to encrypt 802 the audio clip. At step 803 an encrypted bitstream is thereby produced.

Figure 9:
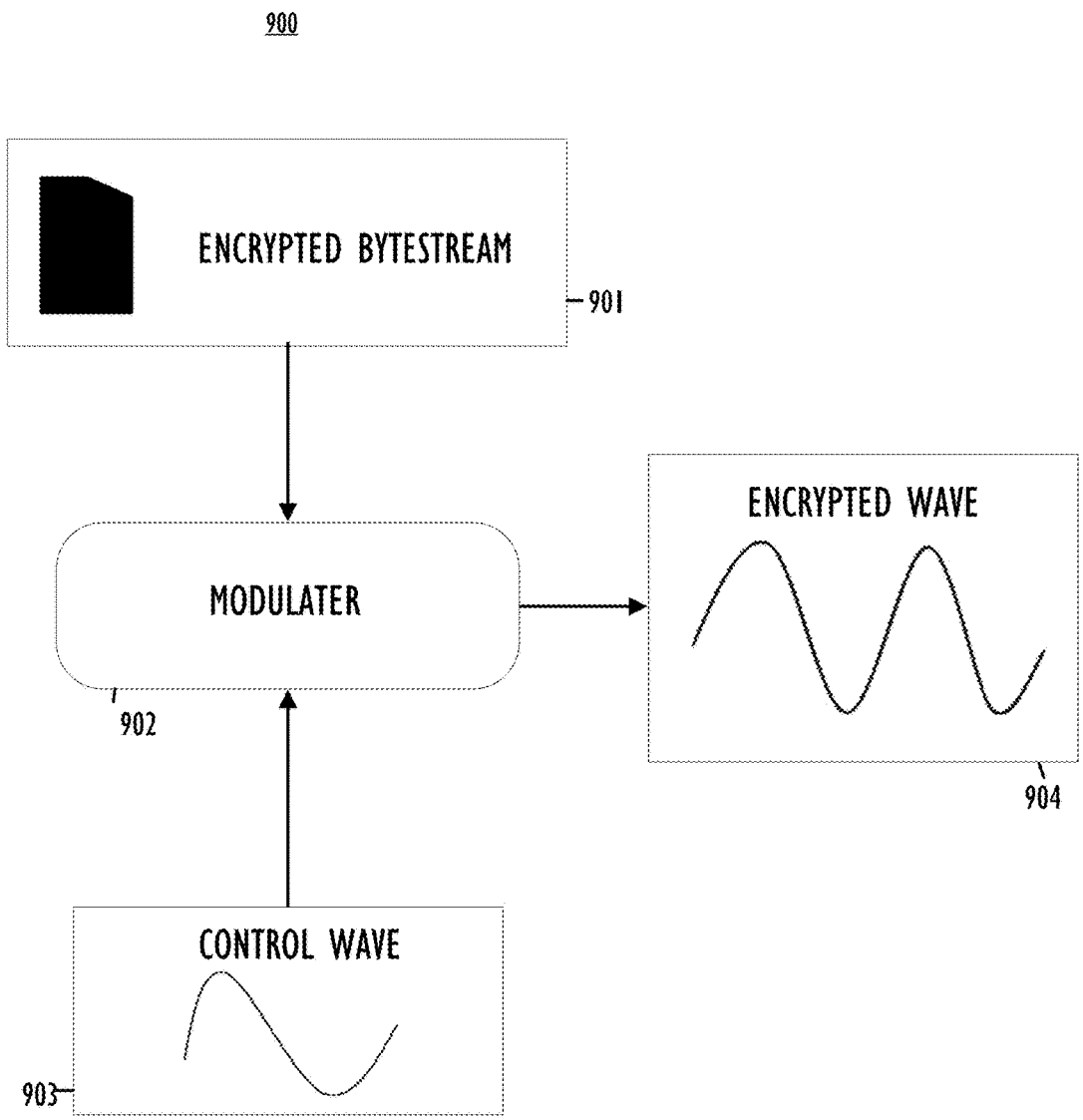
FIG. 9 illustrates a method of producing an encrypted MP3.

FIG. 9 illustrates a method of producing an encrypted MP3. The APC generates an audio wave 903 (a/k/a control wave) at a frequency which is inaudible to the human ear. The APC converts 902 control wave into a bitstream using a modulator module. For each byte of the encrypted bitstream, the APC will append the byte values to the wave's (903) byte stream at its corresponding position. This allows the data in bitstream 901 to be mapped 902 to the generated wave 903 and produce a unique non-audible frequency wave 904. As noted, in some embodiments the encrypted wave 904 will be scattered throughout a larger control wave (not shown) so as to further obfuscate the data.

Figure 10:
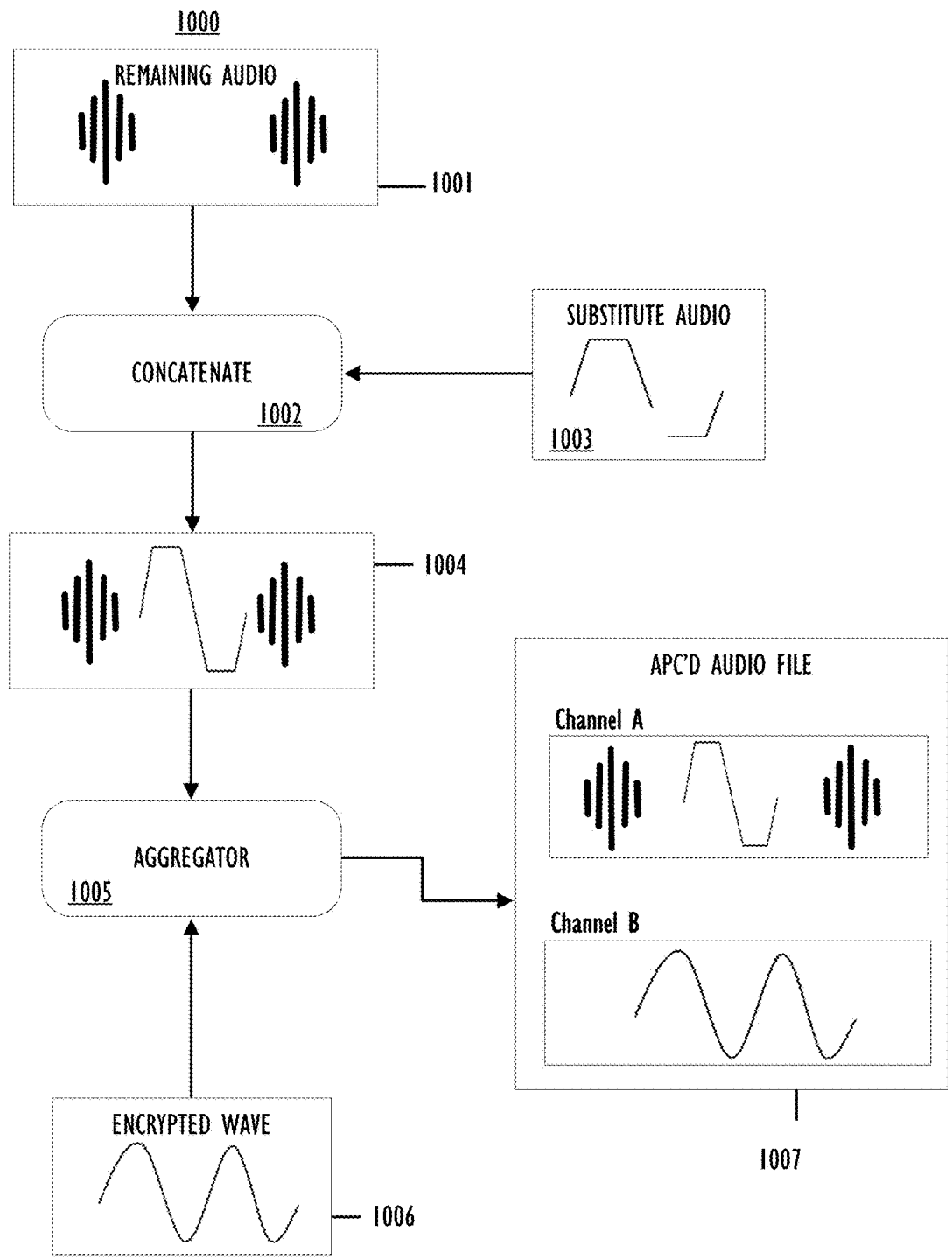
FIG. 10 illustrates a concatenation method 1000. As noted above, concatenation 1002 can be done in one of two ways.

FIG. 1000 illustrates a concatenation method 100. As noted above, concatenation 1002 can be done in one of two ways. As shown in FIG. 10, a finished audio clip 1001 can be completely silent in the spot where the audio clip used to reside. Alternately, the finished audio clip can include a replacement sound 1003 for filling in the spot where the audio clip used to reside. When concatenating with silence, the encrypted wave 1006 is placed 1007 by an aggregator 1005 on the same audio channel (Channel A) as the remaining audio. When played back, the un-authorized receiver will hear silence between the start and end timestamps. (See e.g., FIG. 3). Alternately, the encrypted wave can be placed 1007 in a separate channel (Channel B), with substitute audio 1003 being hear during playback.

Figure 11:
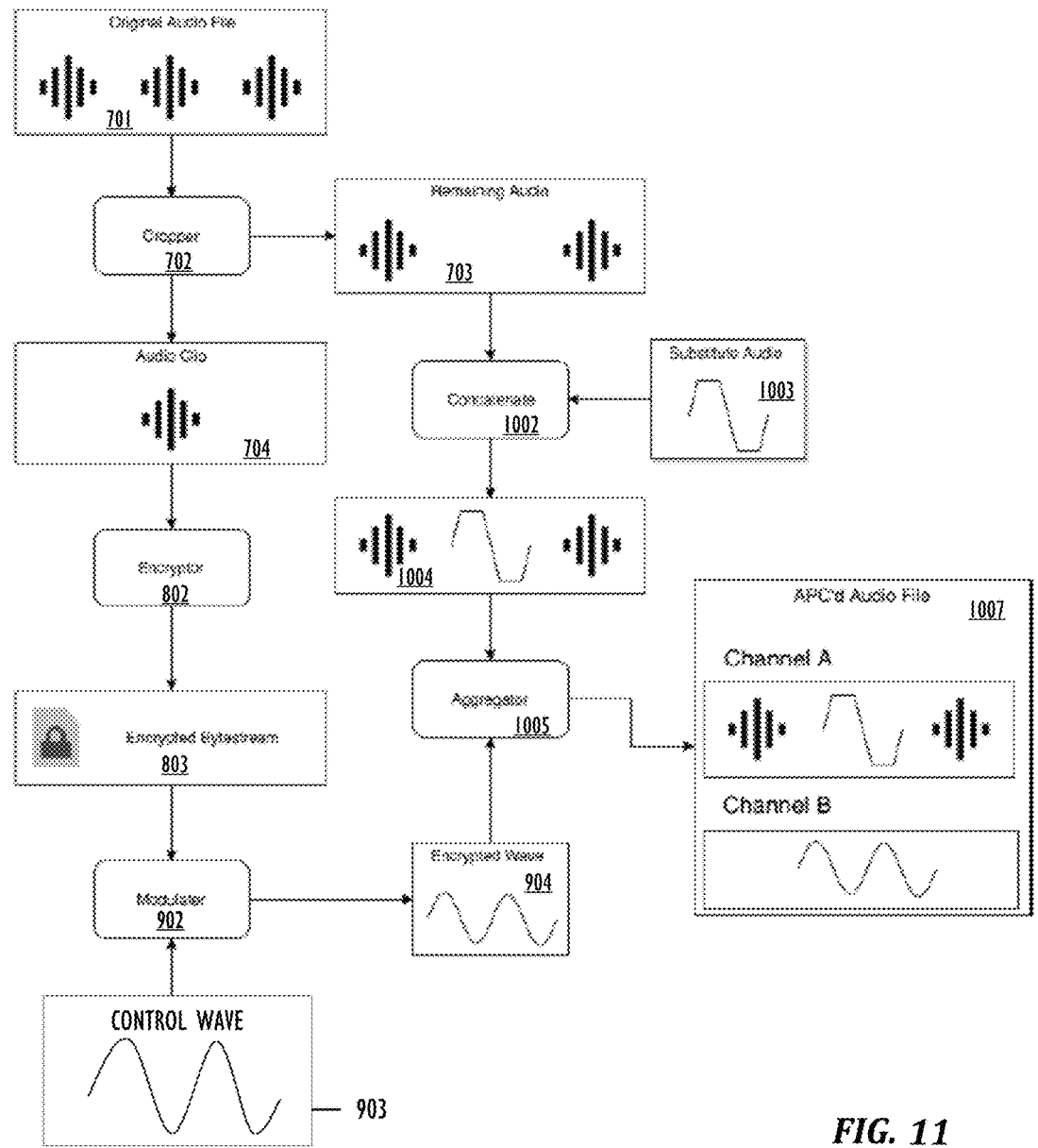
FIG. 11 illustrates how the methods in FIGS. 7-10 are interrelated.

FIG. 11 shows how the methods in FIGS. 7-10 are interrelated.

Figure 12A:
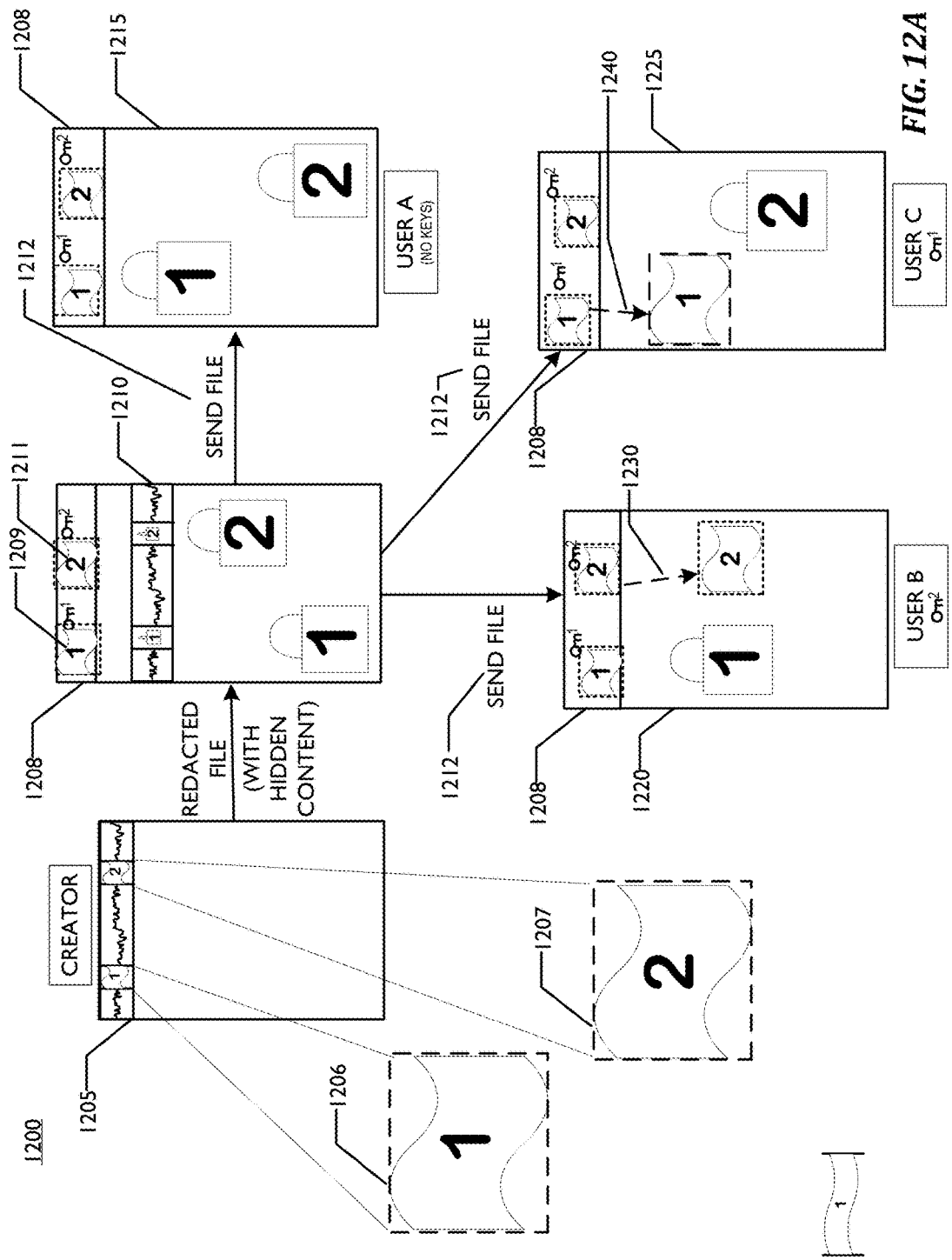
FIG. 12A shows an example of a sub-document-level access permission setting scheme with custom recipient-based privacy settings, according to one or more disclosed embodiments.

FIG. 12A shows an example of an access permission setting scheme 1200 with custom recipient-based privacy settings for MP3 files, according to one embodiment. As demonstrated in the exemplary access permission scheme 1200, a creator or sender ("Creator") may create or edit an audio recording, such as a MP3 file 1205, with custom permission settings applied to it. For example, Creator may edit a copy of a MP3 file to obfuscate information in one or more portions of the MP3 file 1205. Specifically, the Creator may identify particular redacted portions in the MP3 file 1205 to block out from access of certain recipients of the MP3 file 1205. In this example, MP3 file 1205 comprises a bitstream with two sub bitstreams, bitstream '1' and bitstream '2'. The first portion selected for obfuscation by the Creator is portion 1206, which corresponds to bitstream '1' as is shown in zoomed-in form in FIG. 12A for illustrative purposes. The second portion selected for obfuscation by the Creator is portion 1207, which corresponds to bitstream '2,' as is shown in zoomed-in form in FIG. 12A for illustrative purposes. Creator may desire to make bitstream '1' accessible to persons who hold a certain security clearance (e.g., secret), and bitstream '2' available to persons who hold a different security clearance (e.g., top secret).

The obfuscated portions 1206 and 1207 of MP3 file 1205 are represented by the lock-1 and lock-2, respectively, over the corresponding portions of the redacted copy of the MP3 file shown in element 1210 in FIG. 12A. For example, bits at within particular time markers in the redacted copy of the MP3 file 1210 may be cropped, encrypted, and columnated with a control wave to obfuscate the sub-portions of the audio recording 1205 corresponding to portions 1206 and 1207. The protected portions 1206 and 1207 from the original MP3 file 1205 may be hidden (and optionally encrypted), e.g., within one or more applicable header parts 1208 of the redacted copy of the MP3 file 1210, in order to protect the information prior to transmission to recipient users. As shown in FIG. 12A, the hidden (and optionally encrypted) data corresponding to portion 1206 from the original MP3 audio file 1205 (i.e., '1') is labeled 1209, and is shown overlaid with a key icon and a small number '1.' The key icon 1209 with the number '1' next to it indicates that only recipients authorized to hear audio clip '1' (e.g., either through pre-set access permissions and/or by virtue of holding the appropriate decryption key)—when listening to the MP3 file 1210 in an authorized listening application—will actually be able to hear the "true" content of portion 1206, i.e., bitstream '1.' Any recipient that is not an authorized recipient of portion 1206—or who is listening to audio file 1210 outside of an authorized playback application—will simply hear silence or substitute when bitstream '1' is played. Likewise, The key icon 1211 with the number '2' next to it indicates that only recipients authorized to hear audio clip '2' (e.g., either through pre-set access permissions and/or by virtue of holding the appropriate decryption key)—when listening to the MP3 file 1210 in authorized playback application—will actually be able to hear the "true" content of portion 1207, i.e., the content of bitstream '2.' Any recipient that is not an authorized recipient of portion 1207—or who is listening to file 1210 outside of an authorized playback application—will simply hear silence while audio '2' is playing.

The obfuscated MP3 file 1210 that has been augmented with the hidden (and optionally encrypted) redacted content 1209 and 1211 may then be selectively shared with one of three separate users in this example: User A, User B, and User C. In this example, each of User A, User B, and User C may receive the same redacted MP3 audio file 1210. In this embodiment, the access permissions for the redacted MP3 audio file 1210 may be defined differently for each of User A, User B, and User C, such that each User may be able to hear one or more different portions of the redacted information as it was presented in the original MP3 file.

Finally, the Creator may choose to send the MP3 file 1212 to three separate users (either simultaneously or at different times), with the same portions obfuscated out for each recipient (i.e., portions 1206 and 1207 in this case). However, each user may be able to locate (and optionally decrypt) the hidden portions 1209 and 1211 (corresponding, in this case, to audio clip '1' and audio clip '2,' respectively) from the header 1208 of the MP3 file 1210, in order to hear non-redacted portions of the MP3 audio file, in accordance with, e.g., their identity, access permissions, status as a member of a particular group, or their status as a follower of the Creator, etc.

For example, as is shown in FIG. 12A, the audio 1215 of the obfuscated file 1210 sent to "User A" 1215 may still comprise both of the blocked out portions 1206 and 1207 form the original audio 1205, e.g., owing to the fact that User A lacks either the appropriate access permissions and/or decryption keys to hear the "true" content of portions 1206 and 1207 from the original audio 1205. By contrast, the audio 1220 of the obfuscated file 1210 sent to "User B" has only portion 1206 (i.e., bitstream '1') blocked out from playback, e.g., owing to the fact that User B lacks either the appropriate access permissions and/or decryption keys to hear the "true" content of portion 1206 from the original audio 1205 but does have the appropriate access permissions and/or decryption keys to hear the "true" content of portion 1207 from the original audio 1205 (i.e., bitstream '2'). This is indicated by arrow 1230 showing the protected portion corresponding to bitstream '2' being located, decrypted (if necessary), and seamlessly placed at the correct coordinates within audio file. It is also indicated by the presence of the key icon with the number 2 below the "USER B" label in FIG. 12A, denoting the fact that USER B has the necessary permissions and/or decryption keys to locate and decrypt hidden portion 1211. Finally, the audio 1225 of the obfuscated file 1210 sent to "User C" has only portion 1207 (i.e., the portion corresponding to bitstream '2') blocked out from the audio, e.g., owing to the fact that User C lacks either the appropriate access permissions and/or decryption keys to hear the "true" content of portion 1207 from the original audio file (or bitstream therein) 1205 but does have the appropriate access permissions and/or decryption keys to hear the "true" content of portion 1206 from the original audio file (or bitstream therein) 1205 (i.e., bitstream '1'). This is indicated by arrow 1240 showing the protected portion corresponding to bitstream '1' being located, decrypted (if necessary), and seamlessly placed at the location within the audio file (or bitstream therein). It is also indicated by the presence of the key icon with the number 1 below the "USER C" label in FIG. 12A, denoting the fact that USER C has the necessary permissions and/or decryption keys to locate and decrypt hidden portion 1209.

Such a system allows a single version of the lossy file type, for example, MP3 file 1205, to be sent to multiple recipients, while access permission settings associated with each recipient allow each recipient to be able to use an authorized playback application to seamlessly hear only the particular sub-portion(s) of the file that they are authorized to hear, while still maintaining the integrity of the lossy file type, such that it could be played in a standard, i.e., unauthorized, playback application without any of the redacted portions of the file being visible.

Figure 12B:
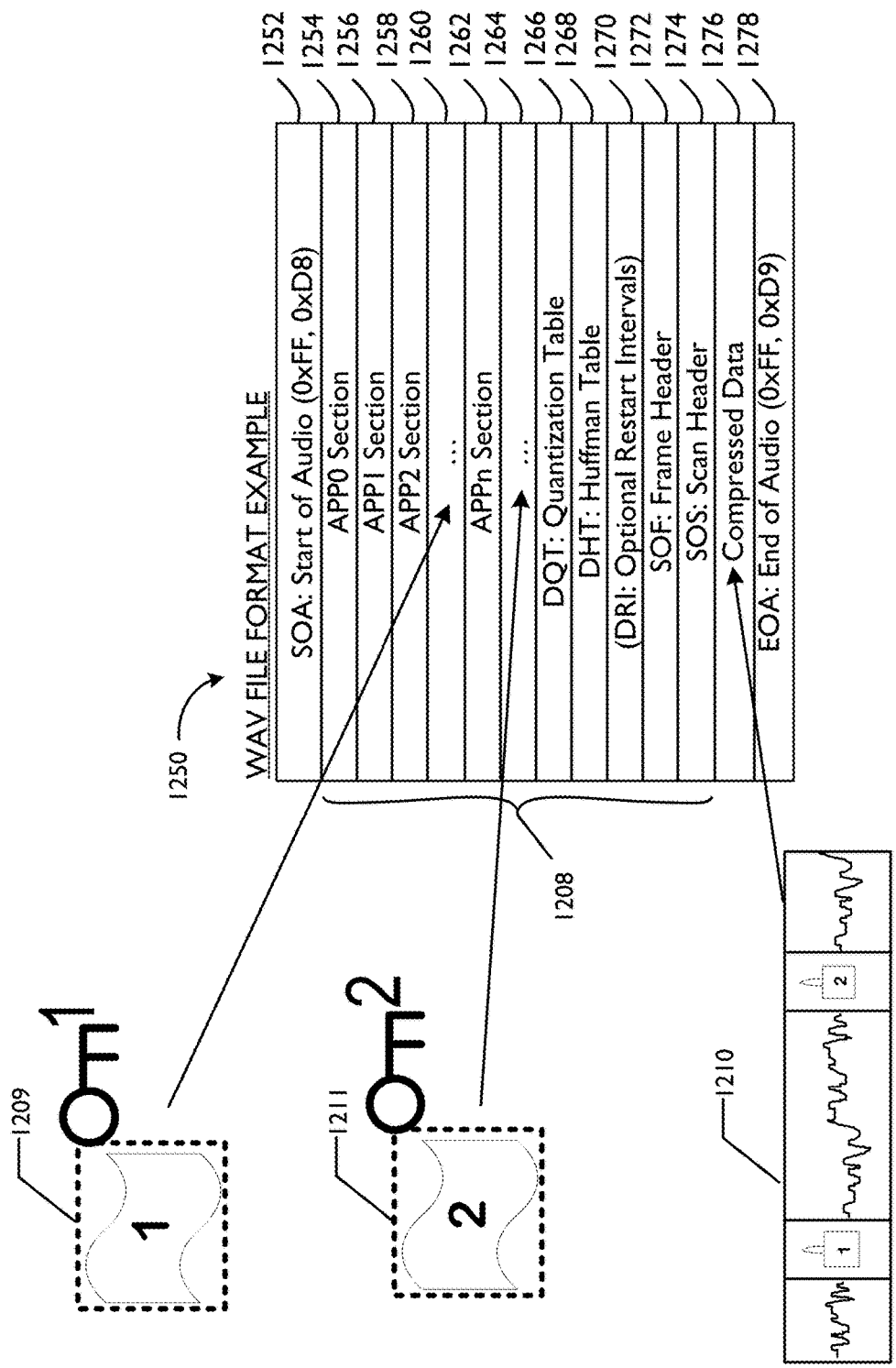
FIG. 12B shows an example of a lossy file type used to store hidden (and/or encrypted) content.

Turning now to FIG. 12B, an example of a lossy file type used to store hidden (and/or encrypted) content is shown in greater detail. In this example, the lossy file type is shown via exemplary MP3 object 1250, which shows one example of a MP3 file format structure. MP3 object 1250 is comprises of a plurality of fields 1252-1278. Data structures for lossy file formats are typically defined over time by the applicable standards settings bodies for each respective file format, and thus are not something that a particular user or system may be able to modify if they wish to have their files be readable/writeable/executable by industry standard players for the particular file format. For example, exemplary MP3 object 1250 may begin with Start of the Audio marker (SOA) property 1252. This property may then be followed by a plurality of Application Marker Sections (APPn) labeled 1254/1256/1258/1262. Various other properties may also be present in a typical MP3 object file structure, e.g., DQT: Quantization Table (1266); DHT: Huffman Table (1268); DRI: Optional Restart Intervals (1270); SOF: Header-1 (372); and SOS: Header-2 (1274). The MP3 object file structure may also include a "Compressed Data" element 1276, where the actual compressed MP3 audio data rendered to a user, e.g., MP3 audio 1210 from the example of FIG. 12A, may be stored. Finally, exemplary MP3 object 1250 may conclude with End of the Audio marker (EOA) property 1278.

Among the various header elements 1208 of MP3 object 1250 may also be one or more fields 1260/1264 where the aforementioned "hidden" (and/or encrypted) redacted content from the bitstream may be stored. In this example, the (optionally encrypted) "true" content from bitstream portion 1209 (i.e., audio clip/bitstream '1') is stored in exemplary element 1260, and the (optionally encrypted) "true" content from bitstream portion 1211 (i.e., audio clip/bitstream '2') is stored in exemplary element 1264. As may now be understood, one or more versions of each redacted portion of the lossy file type may be stored at one or more portions of the lossy file's data structure. Each such portion may be encrypted in such a fashion that only the desired recipient(s) are able to decrypt the respective portions. In some embodiments, only an authorized playback application may know: 1.) where to look in the lossy file's data structure for "hidden" content; 2.) how to decrypt (if necessary) such hidden content intended for a particular recipient; and 3.) how and where (e.g., at what coordinates or at what time stamp) to "re-insert" the located and decrypted information into the original lossy file (e.g., in the form of an individual layer that is layered atop the version of the file having the obfuscated protected content), so as to seamlessly render the file to the desired recipient that plays only those portions of the file that the sender intended the desired recipient to be able to hear.

APC System Access Permission Settings Options

Several examples of potential APC system permission settings that may be applied to particular files of known lossy file types are shown and described below:

Public: Visible to the world. Searchable by search engines. Auto-broadcasted to the creator's "Followers." The "followers" of a particular user may be established by the followers that have been created within the APC file access permission setting system itself (if the recipients are users of such a system), or may be pulled in from third-party services, such as Facebook, Twitter, LinkedIn, etc.

Followers: Notifies and is visible to all followers of the creator.

Just Me: Private setting. Accessible only by user that creates the lossy file type.

My Contacts: All contacts available on user's contact list. The "contacts" of a particular user may be established by the contacts that have been created within the APC file access permission setting system itself, or may be pulled in from third-party services or applications, such as Gmail, Outlook, etc.

Level 1 Contacts: All registered-user contacts who have directly connected with the creator via the APC file access permission setting system itself, e.g., by accepting an invitation from the creator to become a contact. This access permission setting may be thought of as being bi-directional, e.g.: 1.) User A invites User B, and User B accepts; 2.) User B invites User A, and User A accepts. In some embodiments, all "Level 1" contacts of a user may be automatically added to that user's "My Contacts" list.

Level 2 Contacts: Direct contacts of the user's Level 1 contacts.

Level 3 Contacts: Direct contacts of user's Level 2 contacts.

Groups: Users may create one or multiple custom groups for use with the APC access permission setting system.

Custom: Users may manually add contacts, e.g., using an email address or name. The APC file access permission setting system may then auto-suggest users based on name entry (if the name is present in the user's "My Contacts" list). Lossy file types that have a custom access permission setting system associated with them will then only be accessible by the particular users whose information may be added to the custom authorization list for the lossy file type.

Rule-based: User may specify access rules such as location boundaries, authorized network SSIDs or other identifiers, device ID restrictions, etc.

As will be understood, the settings levels described above are merely exemplary, and other ways of specifying access permission setting schemes may be used in particular implementations of an APC file access permission setting system.

Customized Privacy and Access Permission Setting Using Encryption Keys

Figure 13:
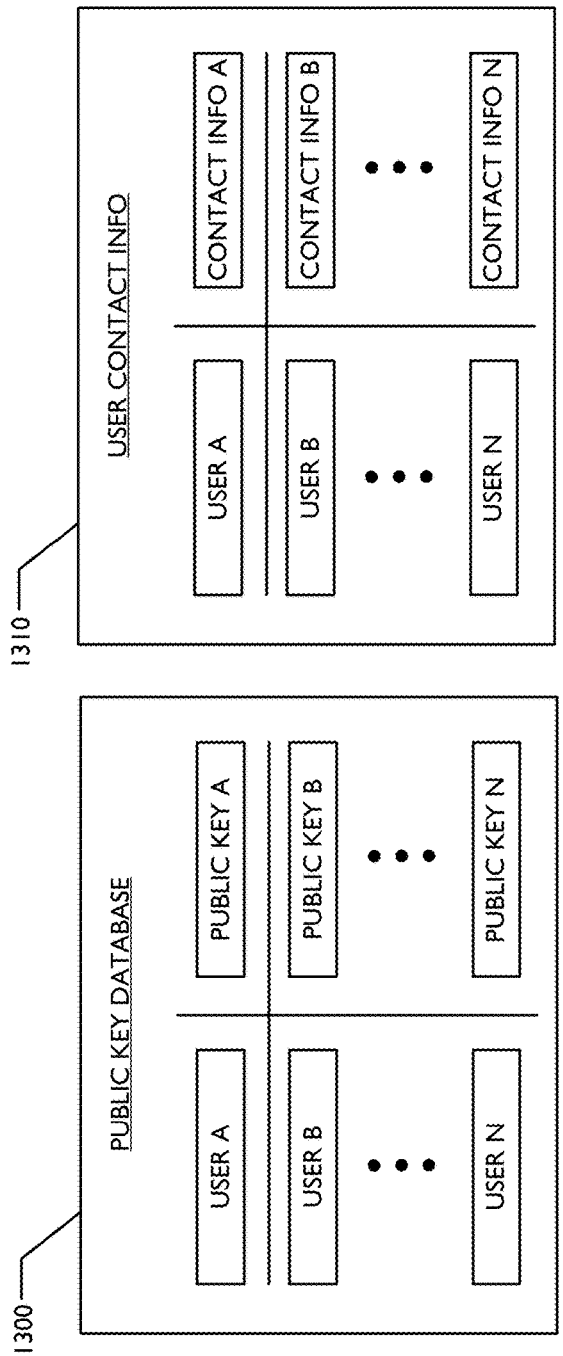
FIG. 13 shows an example of customized privacy setting using encryption keys, according to one or more disclosed embodiments.

FIG. 13 shows an example of a customized APC system that defines access permission setting for one or more users using encryption keys, according to one or more disclosed embodiments. In an embodiment, any encryption methodology may be used such as, for example, AES encryption, or Key-Policy Attribute-Based Encryption (KP-ABE), but other similar encryption methodologies are also contemplated within the scope of the embodiments. Public key database 1300 comprises an association of user profiles and public keys associated with those users. User A in public key database 1300 may refer to the sender in the scenario described above with reference to FIG. 3, whereas Users B-N may refer to potential desired recipients in the scenario described above with reference to FIG. 3. User contact info database 1310 comprises an association of user profiles and contact information associated with those users. Again, user A in contact info database 1310 may refer to the sender in the scenario described above with reference to FIG. 12A, whereas Users B-N may refer to potential desired recipients in the scenario described above with reference to FIG. 12A.

According to some embodiments of the customized privacy settings system described herein, a user may define the recipients for a particular lossy file type, for example, recipients that can play one or more portions of the MP3 file based on user settings. The user may set privacy setting for a particular user, public (e.g., universally accessible) or to a particular group of recipients.

According to one embodiment of a method of utilizing user-defined privacy settings for file sharing, first, the user, e.g., User A as shown in FIG. 13, may create a MP3 file or, alternatively, may select a MP3 file that user A desires to send. Next, the user may choose the user or users that are user A's desired recipients for the selected MP3 file, e.g., User B. Next, the user A contact information, e.g., "Contact Info B" in the contact info database 1310 of FIG. 13, is matched to the user or users that are the desired recipients of the document. Next, each desired recipient user's information may be found in the public encryption key database, e.g., "Public Key B" in public key database 1300 of FIG. 13. Finally, the located public key, e.g., "Public Key B," that may include a set of attributes associated with each user is used to encrypt protected portions in an original MP3 file to create encrypted ciphertext. Further, an edited or obfuscated MP3 file is created that includes the one or more protected portions with coordinates of the MP3 file that may be replaced with black, blur, or the like to create an obfuscated MP3 file. Information that defines whether the obfuscated file is current and/or access code to access a current version of the obfuscated file may also be transmitted as metadata within the obfuscated MP3 file. The encrypted protected portions of the MP3 file and the obfuscated MP3 file may be sent to each of the desired recipients (either separately, or with the protected portions embedded or "hidden" within the obfuscated MP3 file's data structure, as discussed above), who may then use their private keys based on the user attributes to locate and decrypt the encrypted portions of the MP3 file and selectively replace the obfuscated portions with protected information from the decrypted MP3 file based on the user attributes. In some embodiments, attributes can include time of day (playing at a specific time), location (playing within a specific location or distance to a GPS location), or the like.

Figure 14:
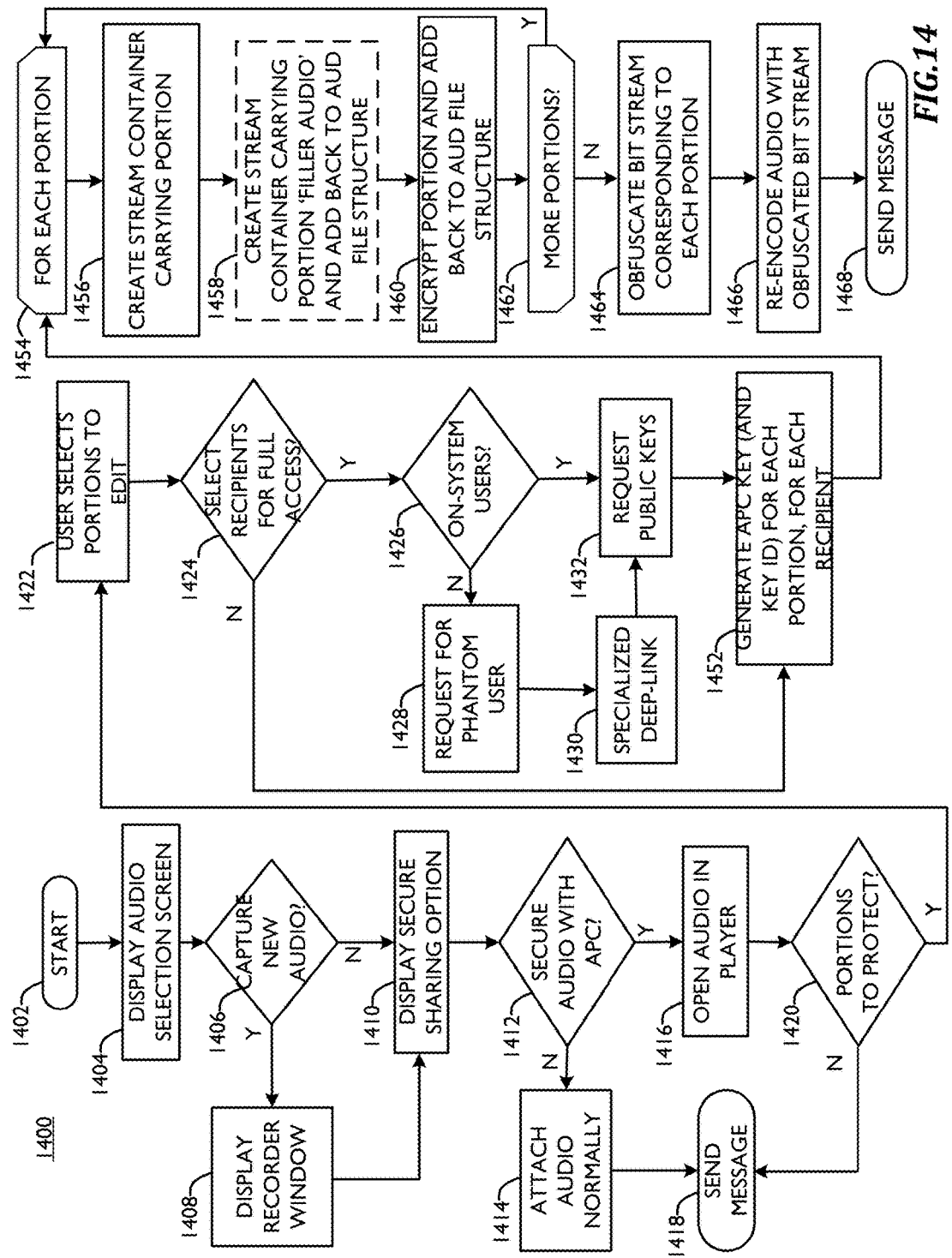
FIG. 14 is a flowchart showing a method for utilizing an APC process for lossy encoded media files from a sender's perspective, according to one or more disclosed embodiments.

FIG. 14 is a flowchart that depicts a method or process flow 1400 for utilizing the APC process on an encoded media file type from a sender's perspective, according to one or more embodiments. Particularly, flow 1400 may be used by a user to attach an obfuscated file, created through user edits, and send the obfuscated file together with optionally encrypted regions of the original file to user recipients (or groups of recipients) associated with on-system or off-system client devices. Flow 1400 begins in 1402 and, next, the sender may be prompted to select an encoded media file, e.g., a MP3 file, from an audio selection screen (step 1404). The audio selection screen may depict an audio stream as plot of volume vs. time (e.g., FIG. 6B) play one or more recordings that may be received from, for example, sync server 105 or from a storage location on the on-system client associated with the sender. Sender may determine whether to capture new audio, e.g., using his or her device's sound recorder application (step 1406). For example, the sender may either capture new audio (i.e., step 1406="Y") at step 1408 or simply select an existing audio file his or her device (and or accessible third party storage) (i.e., step 1406="N") before proceeding to step 1410, where the on-system client may display an APC access permission settings dialog box.

Next, system may determine whether to apply APC access permission settings to the sound file (step 1412). Access permission settings may be manually received by the sender or may be automatically set based on predefined permissions for the sender that are defined for one or more users in contacts. If APC access permission settings are not applied to the sound file (i.e., step 1412="N"), then the sender may save the sound file as a "normal" audio file of the desired encoded media file type (step 1414) and may use the sync server 105 to transmit the sound file to one or more recipients (step 1418).

However, if APC access permission settings are to be applied to the MP3 bitstream (i.e., step 1412="Y"), then the sender may open the audio file in a playback application, e.g., using an on-screen client (step 1416).

Next, the sender may determine whether to protect one or more regions of one or more sections of the audio file (step 1420). If the audio file is not to be protected (i.e., step 1420="N"), then, step 1420 proceeds to step 1418 where the sender may send the unprotected audio file as a "normal" recording, e.g., MP3, file.

However, if one or more portions of the sound file are to be protected (i.e., step 1420="Y"), then the sender may select one or more protected portions, each portion comprising one or more portions (e.g., groups of adjacent bits) of one or more sections of the sound file, to edit, e.g., by replacing them with obfuscated audio clips in a protected copy of the audio file (step 1422). Obfuscation can include selections of edits to be made to the audio clips in the bitstream(s) that can include filler sounds, at the locations within the bitstream corresponding to the coordinate locations of the obfuscated audio clips in the audio file. For example, if an identified voice of a person is selected for obfuscation in a first section of a recording, a user may be presented with an option to automatically obfuscate the audio containing that voice face: for every section in the sound file in which the voice is located; for certain portions of the audio file in which classified information is discussed.

Next, the sender may determine whether there are one or more recipients that may receive access to the full contents of the sound file (step 1424). The recipients for the entire contents of the full sound file can include recipients in the sender's contacts, direct contacts of the user contacts through level 1, 2 and 3, or custom contacts identified by the sender or system, as discussed above. If one or more recipients are selected (i.e., step 1424="Y"), then the system may determine if any recipients are on-system users (step 1426). If the recipients are on-system users (i.e., step 1426="Y"), then, step 1426 proceeds to step 1432 where the system may request public keys for a particular encryption methodology for each selected recipient (if so desired).

However, if any recipients are off-system users (i.e., step 1426="N"), then step 1426 proceeds to step 1428 where the system may request that a phantom user identifier be created for contacts associated with the off-system recipients. Next, sync server 105 may generate a specialized deep-link associated with the phantom user identifier (step 1430). The deep-link may include a hypertext link to a page on a web site that includes, in some embodiments, information for logging-into the system for accessing information associated with the sound file having hidden (and optionally encrypted) content and entering user credentials associated with the user recipient. Step 1430 proceeds to step 1432 where the system requests the public keys for the identified recipients.

However, if there is at least one recipient that receives restricted access to content in the sound file (i.e., step 1424="N"), then the system may generate, in an embodiment, APC encryption keys for encrypting distinct protected portions of the sound file and APC identifiers associated with the respective keys (step 1452). APC identifiers may include access codes that identify the current protection settings for the sound file. The APC keys may be generated according to a Key Policy Attribute Based Encryption (KP-ABE) methodology. In KP-ABE, APC encryption keys and ciphertext (i.e., the encrypted protected portions) are each labeled with descriptive attributes that control which ciphertexts a user recipient is able to decrypt. Attributes that match may provide a user with the requisite access to the protected sections of the lossy file. Next, at step 1452, APC keys and corresponding key IDs may be generated for each recipient of each portion of the sound file that the user has indicated a desire to protect. Then, for each portion (step 1454), the method may create a stream container (e.g., a VOP) comprising the current portion selected for protection from the current section (step 1456). In some embodiments, the portion of the audio carried in the stream container for a given protected portion may be expanded to also include an additional 'n'-bitstream margin buffer around the protected portions in each section. In other words, the protected portion's boundaries may be expanded out an additional 'n' number of bits on either side of the protected portion, for however many sections the particular protected portion spans within the audio file. As will be explained in further detail below with reference to FIG. 8D, this additional 'n'-bit margin buffer may be configured to encompass any aliasing artifacts that may arise around the periphery of the protected portion in any particular section, e.g., as a result of the media file encoding process and, in particular, the encoding of the obfuscated portion in place of the protected portion in the APC-protected version of the encoded media file. Next, as will be explained in further detail below with reference to FIG. 8E, the process may create a 'portion overlay' layer that is designed to be placed around the protected portion and hide any aliasing effects that may arise around the periphery of the protected portion (step 1458). According to this embodiment, the portion overlay layer is not encrypted (since it is outside the scope of the portion that the user has indicated a desire to protect). It is merely extracted and added back into the audio file's structure, e.g., inside an additional one or more stream containers, so that it may be unpackaged later by an audio playback application.

Next, each protected portion may be encrypted with the corresponding APC key for each authorized recipient (or group of recipients) and optionally pre-appended with the corresponding key ID and a bit delimiter used to indicate to a playback application where in the audio file's structure the encrypted content begins, so that the encrypted data may be added back into the file structure of the original file to create an encrypted protected file, e.g., in a stream container object. As mentioned above, the process of steps 1456-1460 may be repeated for each portion in of the original file for which the user has indicated a desire to apply APC protection (step 1462). Moreover, steps 1456 and 1458 may be carried out serially or simultaneously, depending on a given implementation's requirements. Finally, the bitstreams in the original file corresponding to each portion may be obfuscated using a desired obfuscation techniques(s) (Step 1464).

Once all of the protected portions have been extracted, transformed into individual audio layer representations, encrypted, and the underlying protected portions of the original file obfuscated (if desired), the original audio file may be re-encoded with all of the protected portions obfuscated and the encrypted (and unencrypted) sound layers corresponding to the protected portions of the file (as well as any corresponding filler audio layers) having been added back into the file structure of the original file, thereby creating an encrypted protected file. Finally, the outgoing message may be sent to the intended recipient(s) with the encrypted protected file attached (step 1468).

Figure 15:
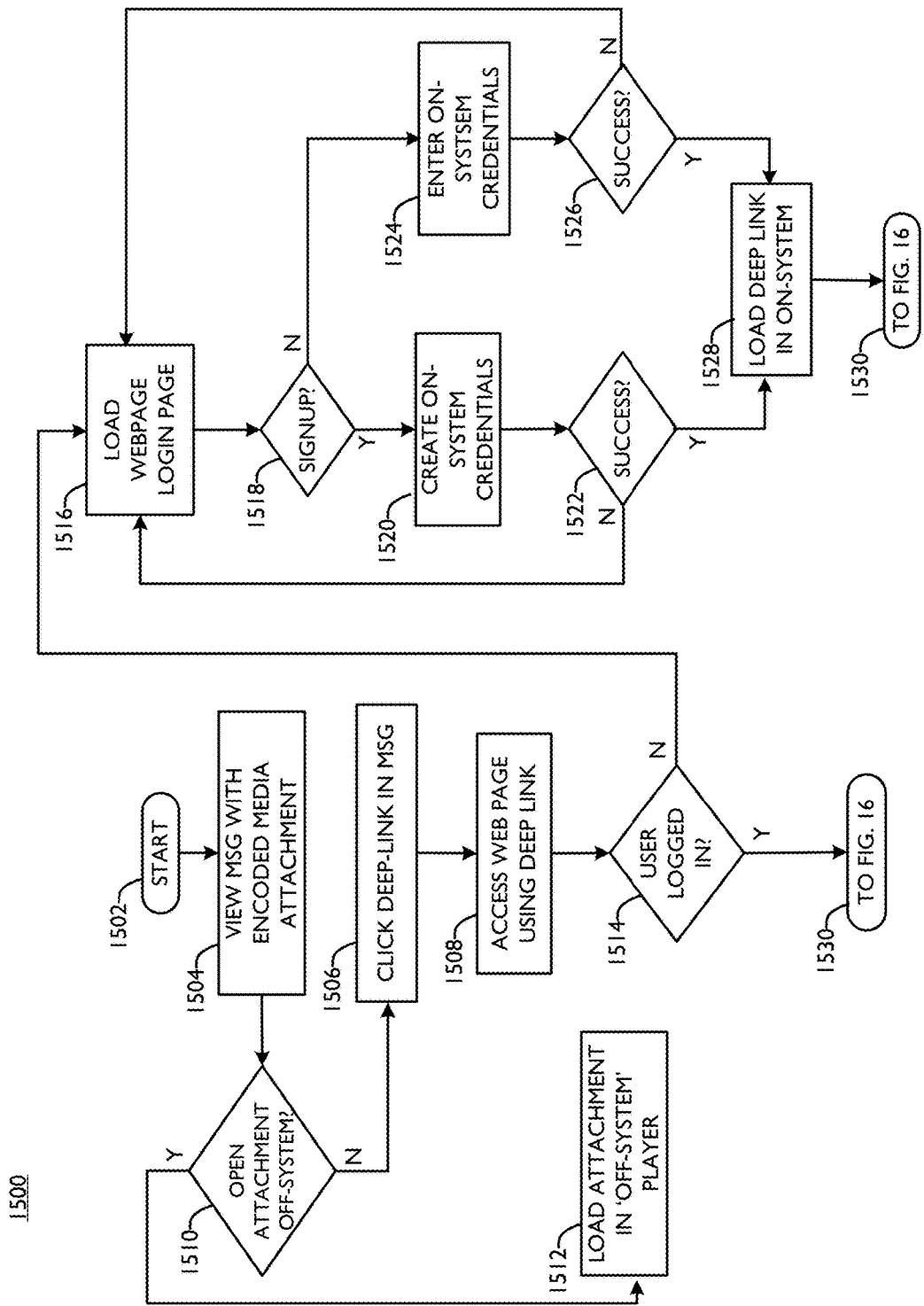
FIGS. 15-16 show flowcharts that depict a method for utilizing a multi-region, layer-based APC process for lossy encoded media files from a recipient's perspective, according to one or more disclosed embodiments.

FIGS. 15-7 depict flowcharts that show a process 1500 from a receiving person's or recipient's perspective, according to one or more embodiments. Process 1500 begins in step 1502, and in step 1504, a recipient may play (e.g., in a third-party email client or a web browser) a message with a bitstream attachment that is received, e.g., in a known lossy encoded media file format. In 1510, the recipient may determine whether to download and open the attachment in an off-system device, e.g., via a plug-in. If the recipient chooses to open and/or download the attachment (i.e., step 1510="Y"), then the recipient may load the file in an appropriate 'off-system' audio playback application on the recipient client device (step 1512). However, if the recipient chooses not to download or open the attachment in an appropriate 'off-system' player, (step 1510="N"), then the recipient may click the deep-link in the message to receive access to the MP3 file (step 1506). Next, clicking the deep-link redirects the recipient to a web page associated with the deep-link (step 1508), e.g., an 'on-system' web page. For example, the redirected web page may be a landing page for an account that is associated with the on-system network of the recipient or a login page for an on-system network to establish an account in the system. Next, the system determines whether the recipient is logged into the system (Step 1514). If the recipient is logged into the system (i.e., step 1514="Y"), process 1514 proceeds to step 1530 (which follows on to FIG. 16B).

However, if the recipient is not logged into the system (i.e., step 1514="N"), then the system may load a login web page that prompts the recipient to input the recipient's credentials for authentication (step 1516). Next, the recipient may sign-on to create on-system credentials or may enter on-system credentials for an existing account in the system (step 1518). If the recipient sigs up to be an on-system user (i.e., step 1518="Y"), then, the recipient enters credentials in the system to create an account as an on-system user (step 1520). If the credentials are successfully entered into the system (i.e., step 1522="Y"), the webpage associated with the deep-link is loaded in a player for the on-system recipient (step 1528). However, if the credentials are not successful (i.e., step 1522="N"), the webpage may be redirected to a login webpage for reentry of user credentials and/or an error message may be provided (step 1516). Step 1528 proceeds to step 1530.

If the recipient logs into the system as an on-system user (i.e., step 1518="N"), then the recipient may enter on-system credentials to be authenticated in the system (step 1524). If the credentials are accepted (i.e., step 1526="Y"), then the deep-link hyperlink may be loaded in an on-system player associated with the on-system recipient (step 1528). Step 1528 proceeds to step 1530 (which follows on to FIG. 16).

Figure 16:
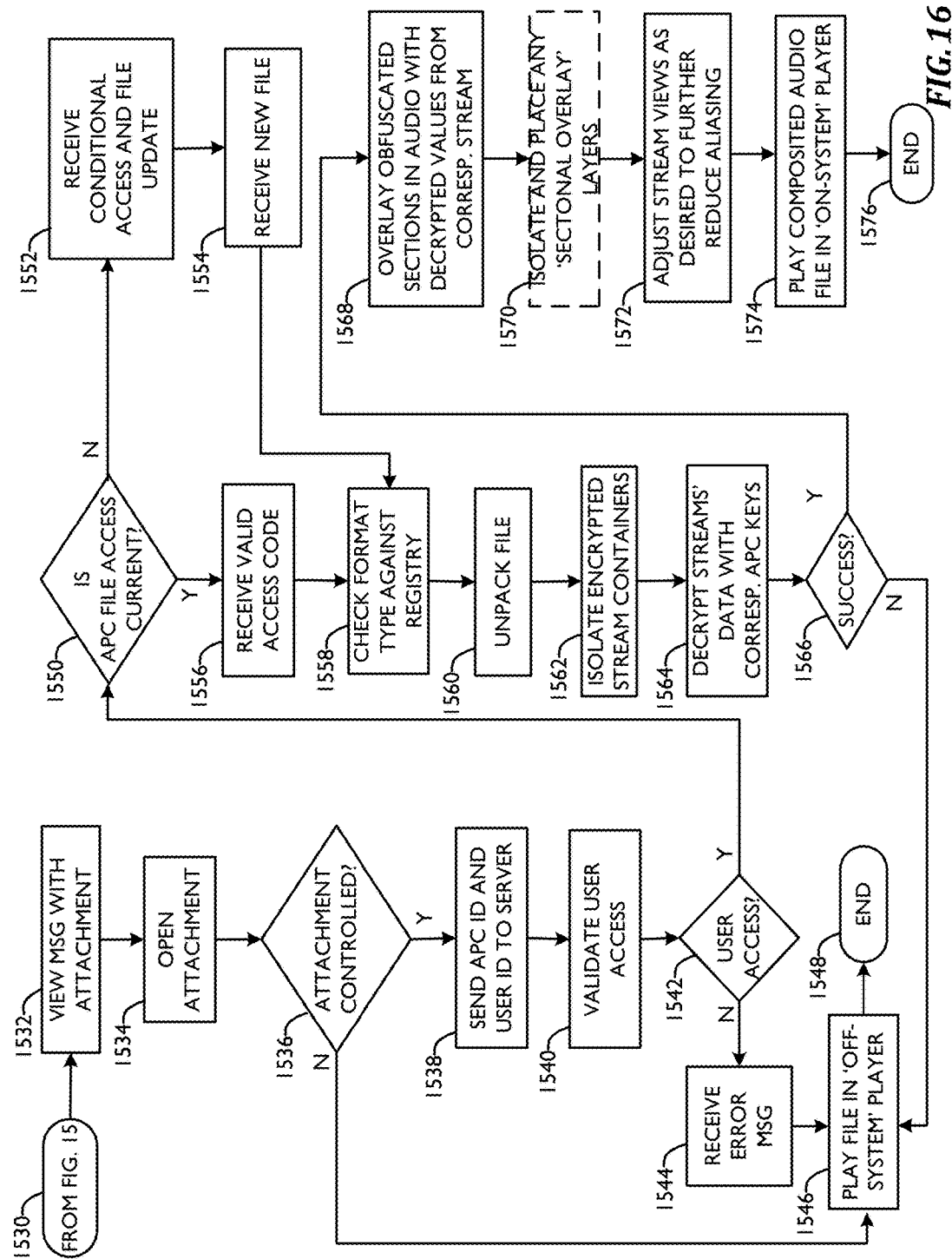

Referring now to FIG. 16, step 1530 proceeds to step 1532, where a recipient may view the message having the attachment in a compatible viewer on a recipient's authorized client device. The attachment can be an unprotected audio file (e.g., MP3 file) or an obfuscated audio file with the associated extracted (and optionally encrypted) protected portions of the original audio file "hidden" in one or more parts of the audio file's data structure (i.e., in audio stream containers, e.g., in the form of VOPs). Next, the client device may open the attachment when the user selects the attachment (step 1534). Next, the system determines whether the attachment includes APC access permission settings (step 1536). If APC access permission settings are not applied to the attachment (i.e., step 1536="N"), then the original audio file may be rendered on a compatible 'off-system' player (i.e., a playback application with no special ability or programming to locate and/or decrypt the hidden and/or encrypted content stored in the audio file's structure) on the recipient's client device (step 1546). Step 1546 proceeds to step 1548 where process ends.

However, if APC access permission settings have been applied to the attachment (i.e., step 1536="Y"), then the APC identifier from the attachment, as well as the user identifier, may be transmitted to the sync server (step 1538). Next, the system may validate the recipient by comparing the user identifier and APC identifier associated with the attachment with information that is stored on the server (step 1540). If the user does not have access to play the attachment (i.e., step 1542="N"), then the recipient may receive an error message that the client device for the recipient has an invalid APC identifier (step 1544). Next, the attachment may be opened as an obfuscated audio file in a compatible 'off-system' player on the recipient's client device (step 1546).

However, if user access is granted (i.e., step 1542="Y"), the system may determine if file access for the audio file in the attachment is still available (step 1550). File access may be determined using the APC identifier. If APC file access is not the most current (i.e., step 1550="N"), then the server may transmit a conditional valid access code and file update link to the recipient's client device. The conditional access code may be used to validate whether the permissions in the container file are current (step 1552). Next, a new file may be received by the recipient's client device upon selecting file update link (step 1554).

However, if the APC file access is current (i.e., step 1550="Y"), the server responds with a valid access code that is transmitted to the player (step 1556). Next, the recipient's client device may check the format of one or more audio files that are received from the server against the registry on the recipient's client device (step 1558). The registry can include settings for applications that may be used to access the information in the audio file. Next, the container file may be unpacked by the recipient's client device (step 1560). The process of unpacking may comprise locating and/or confirming the presence of any APC-protected stream containers, e.g., holding protected portions of the audio file and/or corresponding hollow 'portion overlay' layers within the file structure of the audio file. After unpacking any relevant stream containers from the audio file, the data in the encrypted APC-protected portion(s) and/or corresponding 'portion overlay' layers may be identified and isolated from the rest of the file (step 1562). Next, the recipient's client device decrypts the encrypted audio stream(s) within the APC-protected portion(s) of the bitstream using the appropriate and valid APC key (step 1564). Particularly, the recipient's client device may decrypt the encrypted APC-protected data from the audio file using the recipient's client device private key to retrieve the user public keys (i.e., the APC key). Once the APC key is decrypted, the APC keys may be used to decrypt the encrypted protected portion(s) if the attributes in the ciphertext match the attributes in the APC keys. If the APC data is not able to be decrypted successfully at any point in the process (i.e., step 1566="N"), then the obfuscated audio file may be rendered in a compatible 'off-system' player on the recipient's client device (step 1546), i.e., a playback application that will simply playback the obfuscated version of the audio file.

However, if the APC data is successfully decrypted (i.e., step 1566="Y"), then the recipient's client device may overlay the obfuscated portions in the audio file's content with the decrypted audio content from the corresponding protected portions (step 1568). As mentioned above, the protected portions may each comprise aliasing artifacts around their periphery in one or more audio clipss from being encoded back into the audio file (assuming no further adjustments are made to the encoded protected audio file). As such, as mentioned above, the decrypted portions that are layered back over the obfuscated content in the audio file may contain an additional 'n'-bitstream margin buffer around their periphery to account for the presence of any such aliasing artifacts in the APC-protected version of the audio file. However, the placement of the decrypted portions in the bitstreams may cause further aliasing artifacts around the periphery of the decrypted portion. Thus, in some embodiments, an additional, e.g., hollow, 'portion overlay' layer may be isolated from the audio file and layered on top of the corresponding decrypted portion to ensure that only 'clean' bitstreams (i.e., bitstreams that are not exhibiting aliasing artifacts due to the inclusion of one or more layers on top of the background audio content) are rendered to the player (step 1570). In some embodiments, the portions of the audio layers that are actually rendered to the player may be slightly modified before playback, so as to reduce the presence of aliasing in the final rendered bitstream (step 1572). Finally, after the audio has completed playback, the process ends by proceeding to step 1576.

The terms "a," "an," and "the" are not intended to refer to a singular entity unless explicitly so defined, but include the general class of which a specific example may be used for illustration. The use of the terms "a" or "an" may therefore mean any number that is at least one, including "one," "one or more," "at least one," and "one or more than one." The term "or" means any of the alternatives and any combination of the alternatives, including all of the alternatives, unless the alternatives are explicitly indicated as mutually exclusive. The phrase "at least one of" when combined with a list of items, means a single item from the list or any combination of items in the list. The phrase does not require all of the listed items unless explicitly so defined.

In the foregoing description, for purposes of explanation, numerous specific details are set forth in order to provide a thorough understanding of the disclosed embodiments. The disclosed embodiments may be practiced without these specific details. In other instances, structure and devices are shown in block diagram form in order to avoid obscuring the disclosed embodiments. References to numbers without subscripts or suffixes are understood to reference all instance of subscripts and suffixes corresponding to the referenced number. Moreover, the language used in this disclosure has been principally selected for readability and instructional purposes, and may not have been selected to delineate or circumscribe the inventive subject matter, resort to the claims being necessary to determine such inventive subject matter. Reference in the specification to "one embodiment" or to "an embodiment" means that a particular feature, structure, or characteristic described in connection with the embodiments is included in at least one disclosed embodiment, and multiple references to "one embodiment" or "an embodiment" should not be understood as necessarily all referring to the same embodiment.

It is also to be understood that the above description is intended to be illustrative, and not restrictive. For example, above-described embodiments may be used in combination with each other and illustrative process steps may be performed in an order different than shown. Many other embodiments will be apparent to those of skill in the art upon reviewing the above description. The scope of the invention therefore should be determined with reference to the appended claims, along with the full scope of equivalents to which such claims are entitled. In the appended claims, terms "including" and "in which" are used as plain-English equivalents of the respective terms "comprising" and "wherein."

What is claimed is:

1. A non-transitory computer readable medium storing instructions executable by one or more processing units, the instructions comprising instructions to:
receive an indication of a first portion of a first bitstream of a media file, wherein the first bitstream corresponds to a first channel;
receive an indication of a second portion of a second bitstream of a media file, wherein the second bitstream corresponds to a second channel;
crop the first and second portions;
generate a first scrambled portion and a second scrambled portion by transposing a plurality of bits of the first cropped portion with a plurality of bits of the second cropped portion, wherein the first and second cropped portions are of different lengths corresponding to different periods of time;
encrypt the first scrambled portion with a first encryption key, and the second scrambled portion with a second encryption key;
generate a first control wave for the first encrypted portion and a second control wave for the second encrypted portion;
generate a first steganographic wave by multiplexing the first encrypted portion with the first control wave, and a second steganographic wave by multiplexing the second encrypted portion with the second control wave, wherein the first steganographic wave is the same length as the first cropped portion and the second steganographic wave is the same length as the second cropped portion; and
append the first and second steganographic waves to the media file.

2. The non-transitory computer readable medium of claim 1, wherein appending the first and second steganographic waves to the media file comprises replacing the first cropped portion with the first steganographic wave within the first bitstream in the second channel.

3. The non-transitory computer readable medium of claim 2, wherein appending the first and second steganographic waves to the media file further comprises replacing the second cropped portion with the second steganographic wave within the second bitstream in the second channel.

4. The non-transitory computer readable medium of claim 1, wherein appending the first and second steganographic waves to the media file comprises replacing the first cropped portion with filler audio and placing the first steganographic wave in a third channel.

5. The non-transitory computer readable medium of claim 4, wherein appending the first and second steganographic waves to the media file further comprises replacing the second cropped portion with the second steganographic wave within the second bitstream in the second channel.

6. The non-transitory computer readable medium of claim 1, wherein the first control wave, the second control wave, the first steganographic wave and the second steganographic wave are inaudible to humans.

7. A system, comprising:
a memory; and
one or more processing units, communicatively coupled to the memory, wherein the memory stores instructions to configure the one or more processing units to:
receive an indication of a first portion of a first bitstream of a media file, wherein the first bitstream corresponds to a first channel;
receive an indication of a second portion of a second bitstream of a media file, wherein the second bitstream corresponds to a second channel;
crop the first and second portions;
scramble the first cropped portion and the second cropped portion by transposing a plurality of bits of the first cropped portion with a plurality of bits of the second cropped portion, wherein the first and second cropped portions are of different lengths corresponding to different periods of time;
encrypt the first scrambled portion with a first encryption key, and the second scrambled portion with a second encryption key;
generate a first control wave for the first encrypted portion and a second control wave for the second encrypted portion;
generate a first steganographic wave by multiplexing the first encrypted portion with the first control wave, and a second steganographic wave by multiplexing the second encrypted portion with the second control wave, wherein the first steganographic wave is the same length as the first cropped portion and the second steganographic wave is the same length as the second cropped portion; and append the first and second steganographic waves to the media file.

8. The system of claim 7, wherein appending the first and second steganographic waves to the media file comprises replacing the first cropped portion with the first steganographic wave within the first bitstream in the second channel.

9. The system of claim 8, wherein appending the first and second steganographic waves to the media file further comprises replacing the second cropped portion with the second steganographic wave within the second bitstream in the second channel.

10. The system of claim 7, wherein appending the first and second steganographic waves to the media file comprises replacing the first cropped portion with filler audio and placing the first steganographic wave in a third channel.

11. The system of claim 10, wherein appending the first and second steganographic waves to the media file further comprises replacing the second cropped portion with the second steganographic wave within the second bitstream in the second channel.

12. The system of claim 7, wherein the first control wave, the second control wave, the first steganographic wave and the second steganographic wave are inaudible to humans.

13. A method executed by one or more processing units, the method comprising:
receiving an indication of a first portion of a first bitstream of a media file, wherein the first bitstream corresponds to a first channel;
receiving an indication of a second portion of a second bitstream of a media file, wherein the second bitstream corresponds to a second channel;
cropping the first and second portions;
scrambling the first cropped portion and the second cropped portion, wherein scrambling the first cropped portion and the second cropped portion comprises transposing a plurality of bits of the first cropped portion with a plurality of bits of the second cropped portion, wherein the first and second cropped portions are of different lengths corresponding to different periods of time;
encrypting the first scrambled portion with a first encryption key, and the second scrambled portion with a second encryption key;
generating a first control wave for the first encrypted portion and a second control wave for the second encrypted portion;
generating a first steganographic wave by multiplexing the first encrypted portion with the first control wave, and a second steganographic wave by multiplexing the second encrypted portion with the second control wave, wherein the first steganographic wave is the same length as the first cropped portion and the second steganographic wave is the same length as the second cropped portion; and
appending the first and second steganographic waves to the media file.

14. The method of claim 13, wherein appending the first and second steganographic waves to the media file comprises replacing the first cropped portion with the first steganographic wave within the first bitstream in the second channel.

15. The method of claim 14, wherein appending the first and second steganographic waves to the media file further comprises replacing the second cropped portion with the second steganographic wave within the second bitstream in the second channel.

16. The method of claim 15, wherein appending the first and second steganographic waves to the media file comprises replacing the first cropped portion with filler audio and placing the first steganographic wave in a third channel.

17. The method of claim 16, wherein appending the first and second steganographic waves to the media file further comprises replacing the second cropped portion with the second steganographic wave within the second bitstream in the second channel.

\* \* \* \* \*